United States Patent
Wang et al.

(10) Patent No.: US 12,388,573 B2
(45) Date of Patent: Aug. 12, 2025

(54) DYNAMICALLY CONFIGURABLE ACKNOWLEDGEMENT PROCEDURES

(71) Applicant: QUALCOMM Incorporated, San Diego, CA (US)

(72) Inventors: Xiao Feng Wang, San Diego, CA (US); Dan Zhang, San Diego, CA (US); Huilin Xu, San Diego, CA (US); Jun Ma, San Diego, CA (US); Iyab Issam Sakhnini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 336 days.

(21) Appl. No.: 16/829,990

(22) Filed: Mar. 25, 2020

(65) Prior Publication Data

US 2020/0313806 A1  Oct. 1, 2020

Related U.S. Application Data

(60) Provisional application No. 62/826,956, filed on Mar. 29, 2019.

(51) Int. Cl.
*H04L 1/1812* (2023.01)
*H04W 84/02* (2009.01)

(52) U.S. Cl.
CPC ........... *H04L 1/1812* (2013.01); *H04W 84/02* (2013.01)

(58) Field of Classification Search
CPC .......................... H04L 1/1812; H04W 28/0289
See application file for complete search history.

(56) References Cited

U.S. PATENT DOCUMENTS

| | | | |
|---|---|---|---|
| 8,855,069 B2 * | 10/2014 | Lohr | H04L 1/1887 370/328 |
| 10,097,316 B2 | 10/2018 | Damnjanovic et al. | |
| 10,674,425 B2 | 6/2020 | Gulati et al. | |
| 10,812,982 B2 | 10/2020 | Yerramalli et al. | |
| 11,621,803 B2 | 4/2023 | Wen et al. | |
| 2009/0287976 A1 * | 11/2009 | Wang | H04L 1/1896 714/E11.131 |

(Continued)

FOREIGN PATENT DOCUMENTS

| | | |
|---|---|---|
| CN | 107950065 A | 4/2018 |
| CN | 109155702 A | 1/2019 |

(Continued)

OTHER PUBLICATIONS

Ericsson, "On HARQ for NTN" 2019, 3GPP TSG-RAN WG2 #105, R2-1901560, pp. 1-4 (Year: 2019).*

(Continued)

*Primary Examiner* — Christopher M Crutchfield
*Assistant Examiner* — Tito Q Pham
(74) *Attorney, Agent, or Firm* — Holland & Hart LLP

(57) ABSTRACT

Methods, systems, and devices for wireless communications are described. A base station and a user terminal may communicate via a relaying satellite in a non-terrestrial network. The non-terrestrial network may cause communication disruptions in hybrid automatic repeat request (HARQ) processes due to communication delays. Base stations and user terminals communicating via a satellite may implement dynamically configurable HARQ processes to avoid latency in a wireless communications system.

20 Claims, 20 Drawing Sheets

(56) References Cited

U.S. PATENT DOCUMENTS

| | | | | |
|---|---|---|---|---|
| 2013/0286865 | A1* | 10/2013 | Johansson | H04W 52/40 370/252 |
| 2015/0049694 | A1* | 2/2015 | Choi | H04W 72/042 370/329 |
| 2015/0305003 | A1* | 10/2015 | Chen | H04L 1/1822 370/330 |
| 2016/0020849 | A1* | 1/2016 | Wu | H04W 56/0005 370/281 |
| 2016/0192303 | A1* | 6/2016 | Tender | H04W 56/001 370/316 |
| 2017/0111160 | A1 | 4/2017 | Chen et al. | |
| 2017/0141903 | A1* | 5/2017 | Xu | H04L 5/0055 |
| 2017/0346606 | A1* | 11/2017 | Li | H04L 1/1822 |
| 2018/0083694 | A1* | 3/2018 | Rajagopalan | H04B 7/18519 |
| 2018/0176945 | A1* | 6/2018 | Cao | H04L 5/0044 |
| 2018/0242317 | A1 | 8/2018 | Marinier et al. | |
| 2018/0287764 | A1 | 10/2018 | Hosseini et al. | |
| 2018/0323909 | A1* | 11/2018 | Ying | H04L 1/1822 |
| 2018/0359772 | A1* | 12/2018 | Park | H04W 72/1268 |
| 2019/0058554 | A1 | 2/2019 | Liao et al. | |
| 2019/0215818 | A1* | 7/2019 | Takeda | H04W 72/0406 |
| 2019/0356426 | A1* | 11/2019 | He | H04L 1/1822 |
| 2020/0044792 | A1* | 2/2020 | Vaidya | H04L 47/34 |
| 2021/0135791 | A1* | 5/2021 | Wang | H04L 1/0075 |
| 2021/0136729 | A1* | 5/2021 | Yasukawa | H04W 72/10 |
| 2021/0306104 | A1 | 9/2021 | Zhu | |
| 2021/0356729 | A1 | 11/2021 | Amthor et al. | |
| 2021/0391952 | A1 | 12/2021 | Hofström et al. | |
| 2022/0045803 | A1* | 2/2022 | Lin | H04L 1/1822 |
| 2022/0158770 | A1 | 5/2022 | Hong | |
| 2022/0240283 | A1 | 7/2022 | Hong | |

FOREIGN PATENT DOCUMENTS

| | | |
|---|---|---|
| WO | WO-2016160614 | 10/2016 |
| WO | WO-2017069848 | 4/2017 |
| WO | WO-2017136244 | 8/2017 |
| WO | WO-2018055600 A1 | 3/2018 |
| WO | WO2019160737 A1 * | 8/2019 |

OTHER PUBLICATIONS

Huawei, et al., "Discussion on Data Transmission Related Procedures for NTN", 3GPP TSG RAN WG1 Meeting #96, 3GPP Draft; R1-1903196, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 25, 2019-Mar. 1, 2019, Feb. 16, 2019 (Feb. 16, 2019), 3 Pages, XP051600892, Retrieved from the Internet: URL: http://www.3gpp.org/ftp/tsg%5Fran/WG1%5FRL1/TSGR1%5F96/Docs/R1%2D1903196%2Ezip [retrieved on Feb 16, 2019] paragraph [0002]—paragraph [02.3].

Huawei, et al., "Discussion on HARQ for NTN", 3GPP TSG RAN WG1 Meeting #96, 3GPP Draft; R1-1903203, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 25, 2019-Mar. 3, 2019, Feb. 16, 2019 (Feb. 16, 2019), 3 Pages, XP051600898, Retrieved from the Internet: URL: http://www.3gpp.org/ftp/tsg%5Fran/WG1%5FRL1/TSGR1%5F96/Docs/R1%2D1903203%2Ezip [retrieved on Feb. 16, 2019] the whole document.

Nokia, et al., "Overview for NR Supporting NTN", 3GPP TSG RAN WG1 Meeting #96, 3GPP Draft, R1-1901722, 3rd Generation Partnership Project (3GPP), Mobile Competence Centre, 650, Route Des Lucioles, F-06921, Sophia-Antipolis Cedex, France, vol. RAN WG1, No. Athens, Greece; Feb. 25, 2019-Mar. 1, 2019, Feb. 16, 2019 (Feb. 16, 2019), XP051599418, 10 Pages, Retrieved from the Internet: URL: http://www.3gpp.org/ftp/tsg%5Fran/WG1%5FRL1/TSGR1%5F96/Docs/R1%2D1901722%2Ezip [retrieved on Feb. 16, 2019], paragraph [02.5] the whole document.

Partial International Search Report—PCT/US2020/024839—ISA/EPO—Jul. 15, 2020.

Huawei, et al., "Discussion on Data Transmission Related Procedures for NTN", 3GPP TSG RAN WG1 Meeting #96, 3GPP Draft; R1-1903196, 3rd Generation Partnership Project (3GPP), Mobile Competence Centre ; 650, Route Des Lucioles; F-06921 Sophia-Antipolis Cedex; France, vol. RAN WG1, No. Athens, Greece; Feb. 25, 2019-Mar. 1, 2019, Feb. 16, 2019 (Feb. 16, 2019), 3 Pages, XP051600892, Retrieved from the Internet: URL: http://www.3gpp.org/ftp/tsg%5Fran/WG1%5FRL1/TSGR1%5F96/Docs/R1%201903196%2Ezip [retrieved on Feb. 16, 2019].

Interdigital Inc: "Considerations on HARQ Management for Non Terrestrial Networks", 3GPP TSG RAN WG1 Meeting #92, 3GPP Draft; R1-1802631 Considerations on HARQ Management for Non-Terrestrial Networks, 3rd Generation Partnership Project (3GPP), Mobile Competence Centre; 650, Route Des Lucioles; F-06921 Sophia-An, vol. RAN WG1, No. Athens, Greece; Feb. 26, 2018-Mar. 2, 2018, Feb. 17, 2018 (Feb. 17, 2018), 4 Pages, XP051398069, Retrieved from the Internet: URL: http://www.3gpp.org/ftp/tsg%5Fran/WG1%5FRL1/TSGR1%5F92/Docs/ [retrieved on Feb. 17, 2018].

International Search Report and Written Opinion—PCT/US2020/024839—ISA/EPO—Oct. 23, 2020.

Nokia, et al., "Overview for NR supporting NTN", 3GPP TSG RAN WG1 Meeting #96, 3GPP Draft; R1-1901722, 3rd Generation Partnership Project (3GPP), Mobile Competence Centre ; 650, Route Des Lucioles ; F-06921 Sophia-Antipolis Ceoex ; France, vol. RAN WG1, No. Athens, Greece; Feb. 25, 2019-Mar. 1, 2019 Feb. 16, 2019 (Feb. 16, 2019), 10 Pages, XP051599418, Retrieved from the Internet: URL: http://www.3gpp.org/ftp/tsg%5Fran/WG1%5FRL1/TSGR1%5F96/0ocs/R1%201901722%2Ezip [retrieved on Feb. 16, 2019].

Taiwan Search Report—TW109110498—TIPO—Sep. 6, 2023.

Ericsson: "On HARQ for NTN", 3GPP TSG-RAN WG2 #105, R2-1901560, 3rd Generation Partnership Project (3GPP), Mobile Competence Centre, 650, Route Des Lucioles, F-06921, Sophia-Antipolis Cedex, France, vol. RAN WG2, No. Athens, Greece, Feb. 25, 2019-Mar. 1, 2019, 4 Pages, Feb. 14, 2019, XP051602917, paragraph [02.3].

Ericsson: "On Switching off HARQ for NTN", 3GPP TSG-RAN WG2 #105bis, R2-1904519, 3rd Generation Partnership Project (3GPP), Mobile Competence Centre 650, Route Des Lucioles, F-06921 Sophia-Antipolis Cedex, France, vol. RAN WG2, No. Xi'an, China, Apr. 8, 2019-Apr. 12, 2019, 6 Pages, Mar. 28, 2019, XP051693727, figure 3.

European Search Report—EP23197245—Search Authority—The Hague—Dec. 4, 2023.

Intel Corporation: "Sidelink Physical Layer procedures for NR V2X Communication", 3GPP Draft, 3GPP TSG RAN WG1 Ad-Hoc Meeting 1901, R1-1900481 Intel—EV2X Sl L1 Procedure, 3rd Generation Partnership Project (3GPP), Mobile Competence Centre, 650, Route Des Lucioles, F-06921, Sophia-Antipolis Cedex, France, vol. RAN WG1, No. Taipei, Taiwan; Jan. 21, 2019-Jan. 25, 2019, Jan. 12, 2019 (Jan. 12, 2019), XP051576089, pp. 1-17, pp. 5-6.

VIVO: "Physical Layer Procedure for NR Sidelink", 3GPP Draft, 3GPP TSG RAN WG1 Ad-Hoc Meeting 1901, R1-1900118, Physical Layer Procedure for NR Sidelink, 3rd Generation Partnership Project (3GPP), Mobile Competence Centre, 650, Route Des Lucioles, F-06921 Sophia-Antipolis Cedex, France, vol. RAN WG1, No. Taipei, Jan. 21, 2019-Jan. 25, 2019, Jan. 12, 2019 (Jan. 12, 2019), XP051575742, 9 Pages, pg. 3, last. par, p. 4, first par.

ZTE Corporation, et al., "Consideration on HARQ for NTN", 3GPP TSG RAN WG2 Meeting #105bis, R2-1903392, 3rd Generation Partnership Project (3GPP), Mobile Competence Centre, 650, Route Des Lucioles, F-06921 Sophia-Antipolis Cedex, France, vol. RAN WG2, No. Xi'an, China, Apr. 8, 2019-Apr. 12, 2019, pp. 1-3, Mar. 28, 2019, XP051692660.

ZTE Corporation, et al., "Consideration on HARQ for NTN", 3GPP TSG-RAN WG2 #105 Meeting, R2-1900575, 3rd Generation Partnership Project (3GPP), Mobile Competence Centre, 650, Route Des Lucioles, F-06921, Sophia-Antipolis Cedex, France, vol. RAN

(56) References Cited

OTHER PUBLICATIONS

WG2, No. Athens, Greece, Feb. 25, 2019-Mar. 1, 2019, 5 Pages, Feb. 14, 2019, XP051601955, p. 3.
CATT: "HARQ consideration for NTN", R1-1904551, 3GPP TSG RAN WG1 Meeting #96bis, Xi'an, China, Apr. 8-12, 2019, 2 Pages.
Huawei, et al., "Discussion on disabling HARQ in NTN", R2-1904161, 3GPP TSG-RAN WG2 Meeting #105bis, Xi'an, China, Apr. 8-12, 2019, 2 Pages.
Mediatek Inc: "Summary for more delay-tolerant re-transmission mechanisms in NR-NTN", R1-1907757, 3GPP TSG RAN WG1 Meeting #97, Reno, Nevada, USA, May 13-17, 2019, 8 Pages.
ZTE: "Discussion on the HARQ procedure for NTN", R1-1904768, 3GPP TSG RAN WG1 #96bis, Xi'an, China, Apr. 8-12, 2019, pp. 1-3.
Ericsson: "On HARQ for NTN", 3GPP TSG-RAN WG2 #105, Tdoc R2-1901560, Feb. 14, 2019, 4 Pages.
Ericsson: "On switching off HARQ for NTN", 3GPP TSG-RAN WG2 #105bis, Tdoc R2-1904519, Mar. 28, 2019, 6 Pages.
Taiwan Search Report—TW113128279—TIPO—Mar. 13, 2025.
Gang Z., et al., "Solution of HARQ Timing Collision in Dynamic TDD Technology", China Academic Journal Electronic Publishing House, Jun. 19, 2017, pp. 1-9.
Nokia, et al., "Consideration on HARQ Impact for NTN", 3GPP TSG RAN WG1 Meeting #93, R1-1805848, Busan, Korea, May 21, 2018-May 25, 2018, May 12, 2018, pp. 1-2.

\* cited by examiner

DYNAMICALLY CONFIGURABLE ACKNOWLEDGEMENT PROCEDURES

CROSS REFERENCE

The present Application for Patent claims the benefit of U.S. Provisional Patent Application No. 62/826,956 by Wang et al., entitled "DYNAMICALLY CONFIGURABLE ACKNOWLEDGEMENT PROCEDURES," filed Mar. 29, 2019, assigned to the assignee hereof, and expressly incorporated by reference in its entirety herein.

INTRODUCTION

The following relates generally to wireless communications, and more specifically to configuring acknowledgement processes.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user terminals or user equipment (UE).

Non-terrestrial networks may provide broad coverage by using high altitude relays (e.g., satellites or other non-terrestrial based equipment) between base stations and user terminals. For example, base stations may transmit data to a satellite which may then be relayed to a user terminal.

SUMMARY

A method of wireless communication at a user terminal is described. The method may include receiving, from a base station, a message indicative of a configurable hybrid automatic repeat request (HARQ) process that is configurable on a per-HARQ process basis, and determining a parameter for the configurable HARQ process based on the message. The method may further include performing the configurable HARQ process based on the parameter.

An apparatus for wireless communication at a user terminal is described. The apparatus may include a processor and memory coupled with the processor, the processor and memory configured to cause the apparatus to receive, from a base station, a message indicative of a configurable HARQ process that is configurable on a per-HARQ process basis, and determine a parameter for the configurable HARQ process based on the message. The processor and memory may be further configured to cause the apparatus to perform the configurable HARQ process based on the parameter.

Another apparatus for wireless communication at a user terminal is described. The apparatus may include means for receiving, from a base station, a message indicative of a configurable HARQ process that is configurable on a per-HARQ process basis, and determining a parameter for the configurable HARQ process based on the message. The apparatus may further include performing the configurable HARQ process based on the parameter.

A non-transitory computer-readable medium storing code for wireless communication at a user terminal is described. The code may include instructions executable by a processor to receive, from a base station, a message indicative of a configurable HARQ process that is configurable on a per-HARQ process basis, and determine a parameter for the configurable HARQ process based on the message. The code may further include instructions executable by a processor to perform the configurable HARQ process based on the parameter.

In some examples of the method, apparatuses, and non-transitory computer-readable medium described herein, the message may be received via a communication link in a non-terrestrial network, and where determining the parameter may be based on the wireless communication link being a part of the non-terrestrial network.

Some examples of the method, apparatuses, and non-transitory computer-readable medium described herein may further include operations, features, means, or instructions for determining that a round trip delay associated with the configurable HARQ process between the base station and the user terminal satisfies a threshold, where determining the parameter may be based on determining that the round trip delay satisfies the threshold.

Some examples of the method, apparatuses, and non-transitory computer-readable medium described herein may further include operations, features, means, or instructions for determining that a propagation delay window between transmitting a transport block and receiving a positive acknowledgement or negative acknowledgement satisfies a threshold, and where determining the parameter may be based on determining that the propagation delay window satisfies the threshold.

In some examples of the method, apparatuses, and non-transitory computer-readable medium described herein, determining the parameter further may include operations, features, means, or instructions for reducing a quantity of maximum HARQ retransmissions allowed during the configurable HARQ process based on receiving the message.

In some examples of the method, apparatuses, and non-transitory computer-readable medium described herein, the parameter indicates whether HARQ combining may be used for performing the configurable HARQ process.

Some examples of the method, apparatuses, and non-transitory computer-readable medium described herein may further include operations, features, means, or instructions for performing the configurable HARQ process may be based on the modulation and coding scheme information associated with a quantity of maximum HARQ processes.

In some examples of the method, apparatuses, and non-transitory computer-readable medium described herein, determining the parameter further may include operations, features, means, or instructions for determining to disable one or more features of the HARQ process associated with one or more transport blocks.

In some examples of the method, apparatuses, and non-transitory computer-readable medium described herein, the parameter indicates that a positive acknowledgement or a negative acknowledgement will follow a data transmission.

In some examples of the method, apparatuses, and non-transitory computer-readable medium described herein, the message may be received via RRC signaling or in a SIB.

In some examples of the method, apparatuses, and non-transitory computer-readable medium described herein, the HARQ process may be disabled based on receiving the message, where the message includes an identified HARQ process identifier.

Some examples of the method, apparatuses, and non-transitory computer-readable medium described herein may further include operations, features, means, or instructions for flushing one or more buffers associated with the configurable HARQ process based on receiving the message, where the message includes an indicator to cause the user terminal to flush the one or more buffers associated with the configurable HARQ process.

In some examples of the method, apparatuses, and non-transitory computer-readable medium described herein, determining the parameter further may include operations, features, means, or instructions for determining that a HARQ transmission spans more than one slot, where the parameter includes a size of the HARQ transmission.

Some examples of the method, apparatuses, and non-transitory computer-readable medium described herein may further include operations, features, means, or instructions for receiving one or more grouped code blocks from the transport block over multiple slots.

A method of wireless communication at a user terminal is described. The method may include receiving, at the user terminal, a message indicative of a maximum quantity of parallel HARQ processes supported between a base station and the user terminal, and determining, from the message, the maximum quantity of parallel HARQ processes supported between the base station and the user terminal. The method may further include performing one or more HARQ processes based on the maximum quantity.

An apparatus for wireless communication at a user terminal is described. The apparatus may include a processor and memory coupled with the processor, the processor and memory configured to cause the apparatus to receive, at the user terminal, a message indicative of a maximum quantity of parallel HARQ processes supported between a base station and the user terminal, and determine, from the message, the maximum quantity of parallel HARQ processes supported between the base station and the user terminal. The processor and memory may be further configured to cause the apparatus to perform one or more HARQ processes based on the maximum quantity.

Another apparatus for wireless communication at a user terminal is described. The apparatus may include means for receiving, at the user terminal, a message indicative of a maximum quantity of parallel HARQ processes supported between a base station and the user terminal, and determining, from the message, the maximum quantity of parallel HARQ processes supported between the base station and the user terminal. The apparatus may further include performing one or more HARQ processes based on the maximum quantity.

A non-transitory computer-readable medium storing code for wireless communication at a user terminal is described. The code may include instructions executable by a processor to receive, at the user terminal, a message indicative of a maximum quantity of parallel HARQ processes supported between a base station and the user terminal, and determine, from the message, the maximum quantity of parallel HARQ processes supported between the base station and the user terminal. The code may further include instructions executable by a processor to perform one or more HARQ processes based on the maximum quantity.

In some examples of the method, apparatuses, and non-transitory computer-readable medium described herein, the maximum quantity of parallel HARQ processes may be based on a quantity of buffers the user terminal may be configurable to use for parallel HARQ processes.

Some examples of the method, apparatuses, and non-transitory computer-readable medium described herein may further include operations, features, means, or instructions for identifying a HARQ identifier and at least one of a slot number, a time, or a subframe count, and identifying a first HARQ process of the quantity of parallel HARQ processes based on the HARQ identifier and at least one of the slot number, the time, or the subframe count, where transmitting the message may be based on identifying the first HARQ process.

In some examples of the method, apparatuses, and non-transitory computer-readable medium described herein, a first HARQ process of the quantity of parallel HARQ processes may be indexed by a HARQ identifier and at least one of a slot number, a time, or a subframe count.

Some examples of the method, apparatuses, and non-transitory computer-readable medium described herein may further include operations, features, means, or instructions for configuring a quantity of acknowledgement or negative acknowledgement bits included in a single message that may be associated with the quantity of parallel HARQ processes, and transmitting the single message with the quantity of acknowledgement or negative acknowledgement bits based on receiving the message.

A method of wireless communication at a base station is described. The method may include determining a parameter for a configurable HARQ process that is configurable on a per-HARQ process basis for a user terminal and transmitting, to the user terminal, a message that is indicative of the configurable HARQ process and the parameter.

An apparatus for wireless communication at a base station is described. The apparatus may include a processor and memory coupled with the processor, the processor and memory configured to cause the apparatus to determine a parameter for a configurable HARQ process that is configurable on a per-HARQ process basis for a user terminal and transmit, to the user terminal, a message that is indicative of the configurable HARQ process and the parameter.

Another apparatus for wireless communication at a base station is described. The apparatus may include means for determining a parameter for a configurable HARQ process that is configurable on a per-HARQ process basis for a user terminal and transmitting, to the user terminal, a message that is indicative of the configurable HARQ process and the parameter.

A non-transitory computer-readable medium storing code for wireless communication at a base station is described. The code may include instructions executable by a processor to determine a parameter for a configurable HARQ process that is configurable on a per-HARQ process basis for a user terminal and transmit, to the user terminal, a message that is indicative of the configurable HARQ process and the parameter.

Some examples of the method, apparatuses, and non-transitory computer-readable medium described herein may further include operations, features, means, or instructions for determining that a round trip delay associated with the configurable HARQ process between the base station and the user terminal satisfies a threshold, where determining the parameter may be based on determining that the round trip delay satisfies the threshold.

Some examples of the method, apparatuses, and non-transitory computer-readable medium described herein may further include operations, features, means, or instructions for determining that a propagation delay window between transmitting a transport block and receiving a positive acknowledgement or negative acknowledgement satisfies a threshold, and where determining the parameter may be based on determining that the propagation delay window satisfies the threshold.

In some examples of the method, apparatuses, and non-transitory computer-readable medium described herein, determining the parameter further may include operations, features, means, or instructions for determining to disable one or more features of the HARQ process associated with one or more transport blocks.

Some examples of the method, apparatuses, and non-transitory computer-readable medium described herein may further include operations, features, means, or instructions for disabling HARQ processes may be done on a per-cell basis.

In some examples of the method, apparatuses, and non-transitory computer-readable medium described herein, the message includes an indicator that causes the user terminal to flush one or more buffers associated with the configurable HARQ process.

In some examples of the method, apparatuses, and non-transitory computer-readable medium described herein, the message includes a HARQ acknowledgement configured to cause the user terminal to flush a buffer associated with the configurable acknowledgement process.

In some examples of the method, apparatuses, and non-transitory computer-readable medium described herein, determining the parameter further may include operations, features, means, or instructions for determining that a HARQ transmission spans more than one slot, where the parameter includes a size of the HARQ transmission.

Some examples of the method, apparatuses, and non-transitory computer-readable medium described herein may further include operations, features, means, or instructions for grouping code blocks from multiple transport blocks, and transmitting the grouped code blocks over multiple slots.

A method of wireless communication at a base station is described. The method may include transmitting, to a user terminal, a message indicative of a maximum quantity of parallel HARQ processes supported between the base station and the user terminal, and determining, from the message, the maximum quantity of parallel HARQ processes supported between the base station and the user terminal. The method may further include performing one or more HARQ processes according to the maximum quantity.

An apparatus for wireless communication at a base station is described. The apparatus may include a processor and memory coupled with the processor, the processor and memory configured to cause the apparatus to transmit, to a user terminal, a message indicative of a maximum quantity of parallel HARQ processes supported between the base station and the user terminal, and determine, from the message, the maximum quantity of parallel HARQ processes supported between the base station and the user terminal. The processor and memory may be further configured to cause the apparatus to perform one or more HARQ processes according to the maximum quantity.

Another apparatus for wireless communication at a base station is described. The apparatus may include means for transmitting, to a user terminal, a message indicative of a maximum quantity of parallel HARQ processes supported between the base station and the user terminal, and determining, from the message, the maximum quantity of parallel HARQ processes supported between the base station and the user terminal. The apparatus may further include performing one or more HARQ processes according to the maximum quantity.

A non-transitory computer-readable medium storing code for wireless communication at a base station is described. The code may include instructions executable by a processor to transmit, to a user terminal, a message indicative of a maximum quantity of parallel HARQ processes supported between the base station and the user terminal, and determine, from the message, the maximum quantity of parallel HARQ processes supported between the base station and the user terminal. The code may further include instructions executable by a processor to one or more HARQ processes according to the maximum quantity.

A method of wireless communication at a user terminal is described. The method may include transmitting, to a base station, a first message indicating a capability of the user terminal for participating in a configurable acknowledgement process and receiving, from the base station, a second message indicative of the configurable acknowledgement process, where the configurable acknowledgement process is based on the capability of the user terminal. The method may further include determining a parameter for the configurable acknowledgement process based on the second message and performing the configurable acknowledgement process based on the parameter.

An apparatus for wireless communication at a user terminal is described. The apparatus may include a processor and memory coupled with the processor, the processor and memory configured to cause the apparatus to transmit, to a base station, a first message indicating a capability of the user terminal for participating in a configurable acknowledgement process, and receive, from the base station, a second message indicative of the configurable acknowledgement process, where the configurable acknowledgement process is based on the capability of the user terminal. The processor and memory may be further configured to cause the apparatus to determine a parameter for the configurable acknowledgement process based on the second message, and perform the configurable acknowledgement process based on the parameter.

Another apparatus for wireless communication at a user terminal is described. The apparatus may include means for transmitting, to a base station, a first message indicating a capability of the user terminal for participating in a configurable acknowledgement process, and receiving, from the base station, a second message indicative of the configurable acknowledgement process, where the configurable acknowledgement process is based on the capability of the user terminal. The apparatus may further include determining a parameter for the configurable acknowledgement process based on the second message, and performing the configurable acknowledgement process based on the parameter.

A non-transitory computer-readable medium storing code for wireless communication at a user terminal is described. The code may include instructions executable by a processor to transmit, to a base station, a first message indicating a capability of the user terminal for participating in a configurable acknowledgement process, and receive, from the base station, a second message indicative of the configurable acknowledgement process, where the configurable acknowledgement process is based on the capability of the user terminal. The code may further include instructions executable by a processor to determine a parameter for the configurable acknowledgement process based on the second message, and perform the configurable acknowledgement process based on the parameter.

Some examples of the method, apparatuses, and non-transitory computer-readable medium described herein may further include operations, features, means, or instructions for identifying that a wireless communication link for communicating the second message associated with the configurable acknowledgement process may be part of a non-terrestrial network, where determining the parameter may be based on identifying that the wireless communication link may be part of the non-terrestrial network.

Some examples of the method, apparatuses, and non-transitory computer-readable medium described herein may further include operations, features, means, or instructions for determining that a round trip delay associated with the configurable acknowledgement process between the base station and the user terminal satisfies a threshold, where determining the parameter may be based on determining that the round trip delay satisfies the threshold.

Some examples of the method, apparatuses, and non-transitory computer-readable medium described herein may further include operations, features, means, or instructions for identifying that a propagation delay window between transmitting a message and receiving an acknowledgement or negative acknowledgement satisfies a threshold, where determining the parameter may be based on determining that the propagation delay window satisfies the threshold.

In some examples of the method, apparatuses, and non-transitory computer-readable medium described herein, determining the parameter further may include operations, features, means, or instructions for reducing a quantity of maximum HARQ retransmissions allowed during the configurable acknowledgement process based on receiving the second message.

In some examples of the method, apparatuses, and non-transitory computer-readable medium described herein, the parameter includes the quantity of maximum HARQ retransmissions.

Some examples of the method, apparatuses, and non-transitory computer-readable medium described herein may further include operations, features, means, or instructions for identifying modulation and coding scheme information associated with the quantity of maximum HARQ retransmissions, where performing the configurable acknowledgement process may be based on identifying the modulation and coding scheme information.

In some examples of the method, apparatuses, and non-transitory computer-readable medium described herein, determining the parameter further may include operations, features, means, or instructions for determining to disable HARQ retransmission associated with one or more messages.

In some examples of the method, apparatuses, and non-transitory computer-readable medium described herein, the parameter indicates that a quantity of maximum HARQ retransmissions may be equal to zero.

In some examples of the method, apparatuses, and non-transitory computer-readable medium described herein, the second message includes RRC signaling configured to di sable the HARQ retransmissions.

In some examples of the method, apparatuses, and non-transitory computer-readable medium described herein, the second message includes downlink control information configured to disable the HARQ retransmissions.

In some examples of the method, apparatuses, and non-transitory computer-readable medium described herein, the second message includes an SIB.

Some examples of the method, apparatuses, and non-transitory computer-readable medium described herein may further include operations, features, means, or instructions for identifying a HARQ identifier that indicates the HARQ retransmissions may be disabled based on receiving the second message, where the second message includes the identified HARQ identifier.

Some examples of the method, apparatuses, and non-transitory computer-readable medium described herein may further include operations, features, means, or instructions for flushing one or more buffers associated with the configurable acknowledgement process based on receiving the second message, where the second message includes an indicator to cause the user terminal to flush the one or more buffers associated with the configurable acknowledgement process.

In some examples of the method, apparatuses, and non-transitory computer-readable medium described herein, the indicator includes a new data indicator (NDI), a code block group transmission information (CBGTI) indicator, a code block group flushing out information (CBGFI) indicator, or a combination thereof.

In some examples of the method, apparatuses, and non-transitory computer-readable medium described herein, the second message includes a HARQ acknowledgement configured to cause the user terminal to flush a buffer associated with the configurable acknowledgement process.

In some examples of the method, apparatuses, and non-transitory computer-readable medium described herein, determining the parameter further may include operations, features, means, or instructions for determining a quantity of parallel HARQ processes between the base station and the user terminal.

In some examples of the method, apparatuses, and non-transitory computer-readable medium described herein, the quantity of parallel HARQ processes may be greater than sixteen HARQ processes.

In some examples of the method, apparatuses, and non-transitory computer-readable medium described herein, the first message indicates a quantity of buffers the user terminal may be configurable to use for parallel HARQ processes, and the quantity of parallel HARQ processes may be based on the quantity of buffers.

In some examples of the method, apparatuses, and non-transitory computer-readable medium described herein, the second message includes a HARQ identifier having five or more bits.

Some examples of the method, apparatuses, and non-transitory computer-readable medium described herein may further include operations, features, means, or instructions for identifying a HARQ identifier and at least one of a slot number, a time, or a subframe count, and identifying a first HARQ process of the quantity of parallel HARQ processes based on the HARQ identifier and at least one of the slot number, the time, or the subframe count, where transmitting the second message may be based on identifying the first HARQ process.

In some examples of the method, apparatuses, and non-transitory computer-readable medium described herein, a first HARQ process of the quantity of parallel HARQ processes may be indexed by a HARQ identifier and at least one of a slot number, a time, or a subframe count.

Some examples of the method, apparatuses, and non-transitory computer-readable medium described herein may further include operations, features, means, or instructions for configuring a quantity of acknowledgement or negative acknowledgement bits included in a single message that may be associated with the quantity of parallel HARQ processes, and transmitting the single message with the quantity of acknowledgement or negative acknowledgement bits based on receiving the second message.

In some examples of the method, apparatuses, and non-transitory computer-readable medium described herein, determining the parameter further may include operations, features, means, or instructions for determining that a HARQ transmission spans more than one slot, where the parameter includes a size of the HARQ transmission.

Some examples of the method, apparatuses, and non-transitory computer-readable medium described herein may further include operations, features, means, or instructions for determining a size of a transport block associated with the HARQ transmission, where determining that the HARQ transmission spans more than one slot may be based on determining the size of the transport block.

Some examples of the method, apparatuses, and non-transitory computer-readable medium described herein may further include operations, features, means, or instructions for receiving one or more grouped code blocks from multiple transport blocks over multiple slots.

In some examples of the method, apparatuses, and non-transitory computer-readable medium described herein, the size of the HARQ transmission may be configured to fill a propagation delay window associated with a round trip delay of the configurable acknowledgement process.

A method of wireless communication at a base station is described. The method may include receiving, from a user terminal, a first message indicating a capability of the user terminal to participate in a configurable acknowledgement process, determining a parameter for the configurable acknowledgement process based on the capability of the user terminal, and transmitting, to the user terminal, a second message that is indicative of the configurable acknowledgement process and the parameter.

An apparatus for wireless communication at a base station is described. The apparatus may include a processor and memory coupled with the processor, the processor and memory configured to cause the apparatus to receive, from a user terminal, a first message indicating a capability of the user terminal to participate in a configurable acknowledgement process, determine a parameter for the configurable acknowledgement process based on the capability of the user terminal, and transmit, to the user terminal, a second message that is indicative of the configurable acknowledgement process and the parameter.

Another apparatus for wireless communication at a base station is described. The apparatus may include means for receiving, from a user terminal, a first message indicating a capability of the user terminal to participate in a configurable acknowledgement process, determining a parameter for the configurable acknowledgement process based on the capability of the user terminal, and transmitting, to the user terminal, a second message that is indicative of the configurable acknowledgement process and the parameter.

A non-transitory computer-readable medium storing code for wireless communication at a base station is described. The code may include instructions executable by a processor to receive, from a user terminal, a first message indicating a capability of the user terminal to participate in a configurable acknowledgement process, determine a parameter for the configurable acknowledgement process based on the capability of the user terminal, and transmit, to the user terminal, a second message that is indicative of the configurable acknowledgement process and the parameter.

Some examples of the method, apparatuses, and non-transitory computer-readable medium described herein may further include operations, features, means, or instructions for identifying that a wireless communication link for communicating the second message associated with the configurable acknowledgment process may be part of a non-terrestrial network, where determining the parameter may be based on identifying that the wireless communication link may be part of the non-terrestrial network.

Some examples of the method, apparatuses, and non-transitory computer-readable medium described herein may further include operations, features, means, or instructions for determining that a round trip delay associated with the configurable acknowledgement process between the base station and the user terminal satisfies a threshold, where determining the parameter may be based on determining that the round trip delay satisfies the threshold.

Some examples of the method, apparatuses, and non-transitory computer-readable medium described herein may further include operations, features, means, or instructions for identifying that a propagation delay window between transmitting a message and receiving an acknowledgement or negative acknowledgement satisfies a threshold, where determining the parameter may be based on determining that the propagation delay window satisfies the threshold.

In some examples of the method, apparatuses, and non-transitory computer-readable medium described herein, determining the parameter further may include operations, features, means, or instructions for reducing a quantity of maximum HARQ retransmissions allowed during the configurable acknowledgement process based on the capability of the user terminal.

In some examples of the method, apparatuses, and non-transitory computer-readable medium described herein, the parameter includes the quantity of maximum HARQ retransmissions.

Some examples of the method, apparatuses, and non-transitory computer-readable medium described herein may further include operations, features, means, or instructions for identifying modulation and coding scheme information associated with the quantity of maximum HARQ retransmissions, where transmitting the second message may be based on identifying the modulation and coding scheme information.

In some examples of the method, apparatuses, and non-transitory computer-readable medium described herein, determining the parameter further may include operations, features, means, or instructions for determining to disable HARQ retransmission associated with one or more messages.

In some examples of the method, apparatuses, and non-transitory computer-readable medium described herein, the parameter indicates that a quantity of maximum HARQ retransmissions may be equal to zero.

Some examples of the method, apparatuses, and non-transitory computer-readable medium described herein may further include operations, features, means, or instructions for disabling HARQ retransmissions on a per-user terminal basis.

In some examples of the method, apparatuses, and non-transitory computer-readable medium described herein, the second message includes RRC signaling configured to di sable the HARQ retransmissions.

In some examples of the method, apparatuses, and non-transitory computer-readable medium described herein, the second message includes downlink control information configured to disable the HARQ retransmissions.

Some examples of the method, apparatuses, and non-transitory computer-readable medium described herein may further include operations, features, means, or instructions for disabling HARQ retransmissions on a per-cell basis.

In some examples of the method, apparatuses, and non-transitory computer-readable medium described herein, the second message includes an SIB.

Some examples of the method, apparatuses, and non-transitory computer-readable medium described herein may further include operations, features, means, or instructions for identifying a HARQ identifier that indicates the HARQ retransmissions may be disabled, where the second message includes the identified HARQ identifier.

In some examples of the method, apparatuses, and non-transitory computer-readable medium described herein, the second message includes an indicator that causes the user terminal to flush one or more buffers associated with the configurable acknowledgement process.

In some examples of the method, apparatuses, and non-transitory computer-readable medium described herein, the indicator includes an NDI, a CBGTI indicator, a CBGFI indicator, or a combination thereof.

In some examples of the method, apparatuses, and non-transitory computer-readable medium described herein, the second message includes a HARQ acknowledgement configured to cause the user terminal to flush a buffer associated with the configurable acknowledgement process.

In some examples of the method, apparatuses, and non-transitory computer-readable medium described herein, determining the parameter further may include operations, features, means, or instructions for determining a quantity of parallel HARQ processes between the base station and the user terminal.

In some examples of the method, apparatuses, and non-transitory computer-readable medium described herein, the quantity of parallel HARQ processes may be greater than sixteen HARQ processes.

In some examples of the method, apparatuses, and non-transitory computer-readable medium described herein, the first message indicates a quantity of buffers the user terminal may be configurable to use for parallel HARQ processes, and the quantity of parallel HARQ processes may be based on the quantity of buffers.

In some examples of the method, apparatuses, and non-transitory computer-readable medium described herein, the second message includes a HARQ identifier having five or more bits.

Some examples of the method, apparatuses, and non-transitory computer-readable medium described herein may further include operations, features, means, or instructions for identifying a HARQ identifier and at least one of a slot number, a time, or a subframe count, and identifying a first HARQ process of the quantity of parallel HARQ processes based on the HARQ identifier and at least one of the slot number, the time, or the subframe count, where transmitting the second message may be based on identifying the first HARQ process.

In some examples of the method, apparatuses, and non-transitory computer-readable medium described herein, a first HARQ process of the quantity of parallel HARQ processes may be indexed by a HARQ identifier and at least one of a slot number, a time, or a subframe count.

Some examples of the method, apparatuses, and non-transitory computer-readable medium described herein may further include operations, features, means, or instructions for configuring a quantity of acknowledgement or negative acknowledgement bits included in a single message that may be associated with the quantity of parallel HARQ processes, and receiving the single message with the quantity of acknowledgement or negative acknowledgement bits based on transmitting the second message.

In some examples of the method, apparatuses, and non-transitory computer-readable medium described herein, determining the parameter further may include operations, features, means, or instructions for determining that a HARQ transmission spans more than one slot, where the parameter includes a size of the HARQ transmission.

Some examples of the method, apparatuses, and non-transitory computer-readable medium described herein may further include operations, features, means, or instructions for determining a size of a transport block associated with the HARQ transmission, where determining that the HARQ transmission spans more than one slot may be based on determining the size of the transport block.

Some examples of the method, apparatuses, and non-transitory computer-readable medium described herein may further include operations, features, means, or instructions for grouping code blocks from multiple transport blocks, and transmitting the grouped code blocks over multiple slots.

Some examples of the method, apparatuses, and non-transitory computer-readable medium described herein may further include operations, features, means, or instructions for enlarging the size of the HARQ transmission to fill a propagation delay window associated with a round trip delay of the configurable acknowledgement process

DETAILED DESCRIPTION

Figure 1:
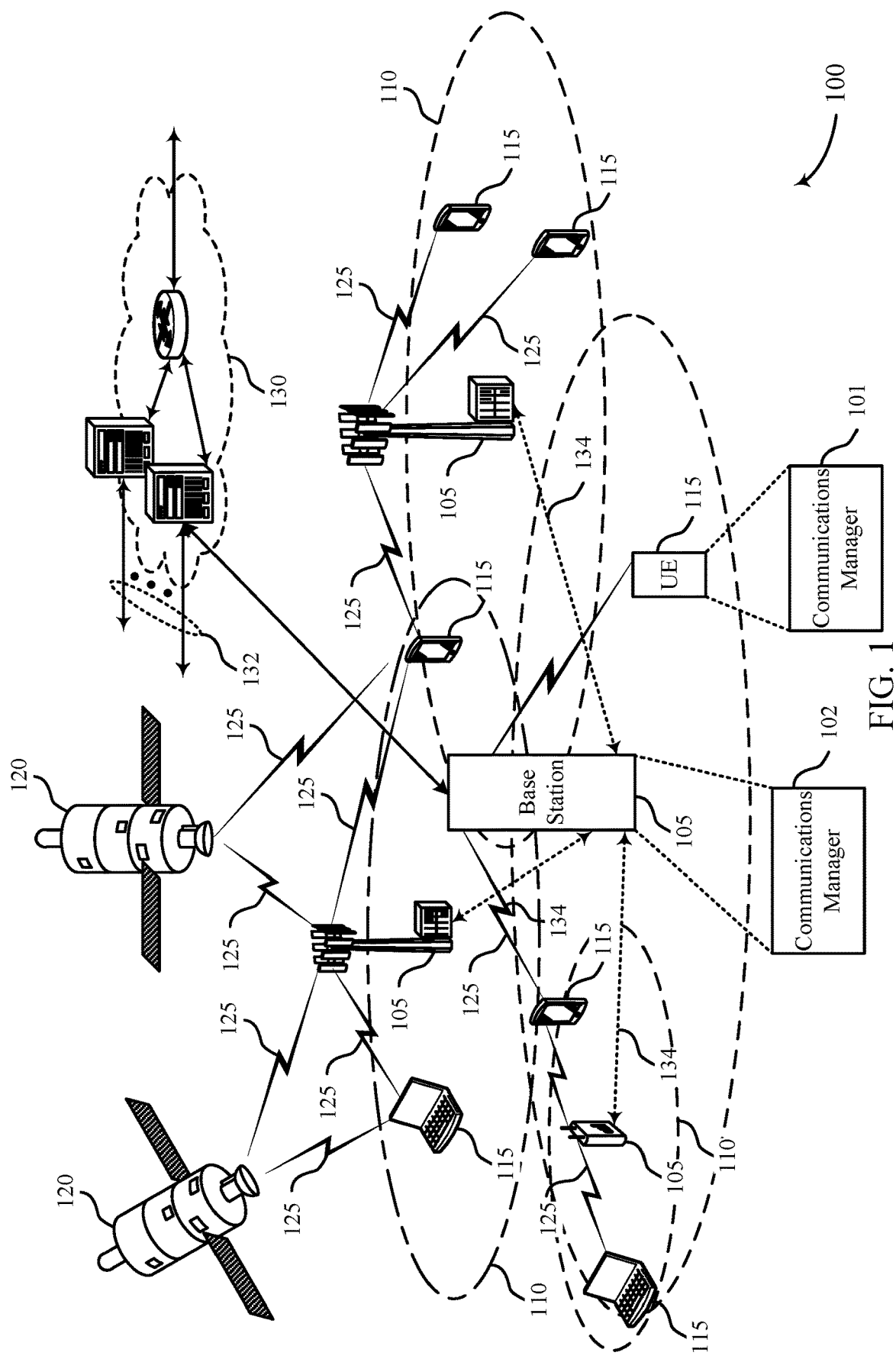
FIG. 1 illustrates an example of a system for wireless communications that supports dynamically configurable acknowledgement procedures in accordance with one or more aspects of the present disclosure.

Non-terrestrial networks (sometimes referred to as NTNs) may provide coverage by using high-altitude relays between base stations and user terminals. For example, base stations may transmit data to a satellite which may then be relayed to a user terminal or vice-versa. A user terminal may be any device having the capability to transmit signals to a satellite. Examples of a user terminal may include user equipment (UE), relay equipment configured to relay a signal between a satellite and a user terminal, or a combination thereof. The base station and the satellite may be thousands of kilometers apart and it may take some time for electromagnetic waves to propagate over the distance between the base station and the satellite and between the satellite and the user terminal. The propagation delay for non-terrestrial networks may be many orders of magnitude larger than the propagation delay for terrestrial networks. As such, the round trip delay (sometimes referred to as an RTD) associated with a signal may also be orders of magnitude larger for non-terrestrial networks than for terrestrial networks.

The long round trip delay associated with non-terrestrial networks may cause issues with downlink HARQ processes. For instance, retransmission or HARQ processes may take much longer in a non-terrestrial network communications system when compared to a terrestrial network because of the long round trip delay of signals. In some wireless communication systems, a user terminal may support a maximum quantity of HARQ processes running in parallel per slot (e.g., sixteen (16) parallel HARQ processes per slot). As the round trip delay increases, the amount of time it takes to resolve a HARQ process may also increase. In some networks, a maximum quantity of supportable HARQ processes may be configured to make it so user terminal does not run out of HARQ processes running in parallel. For example, under normal circumstances, the user terminal may be configured to resolve at least one HARQ process before it starts using the maximum quantity of supportable HARQ processes. After the round trip delay reaches a certain length, the user terminal may be able to start the maximum quantity of HARQ processes before other HARQ processes are resolved. In such circumstances, the user terminal may not be able to run a HARQ process for signals that exceed the maximum quantity of HARQ processes.

Techniques are described for configuring HARQ processes when the round trip delay is longer than a threshold. An example of when such HARQ process configurations may be used may be when communication links are established over a non-terrestrial network. In some implementations, a maximum quantity of HARQ retransmission that are part of a HARQ process may be configurable. In some implementations, a HARQ process may be disabled based on the round trip delay satisfying the threshold. In some implementations, a maximum quantity of HARQ processes being run in parallel may be configurable based on the round trip delay satisfying the threshold. In yet other implementations, a size of HARQ transmissions may be expanded to fill the propagation delay window caused by the increased round trip delay.

Aspects of the disclosure are initially described in the context of a wireless communications system. Aspects of the disclosure are also illustrated by transmission diagrams and process flow diagrams. Aspects of the disclosure are further illustrated by and described with reference to apparatus diagrams, system diagrams, and flowcharts that relate to dynamically configurable acknowledgement procedures.

FIG. 1 illustrates an example of a wireless communications system 100 that supports dynamically configurable acknowledgement procedures in accordance with one or more aspects of the present disclosure. The wireless communications system 100 includes base stations 105, user terminals 115, satellites 120, and a core network 130. In some examples, the wireless communications system 100 may be an LTE network, an LTE-A network, an LTE-A Pro network, or a NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with user terminals 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The user terminals 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various user terminals 115 is supported. Each base station 105 may provide communication coverage for a respective geographic coverage area 110 via communication links 125, and communication links 125 between a base station 105 and a user terminal 115 may utilize one or more carriers. Communication links 125 shown in wireless communications system 100 may include uplink transmissions from a user terminal 115 to a base station 105, or downlink transmissions from a base station 105 to a user terminal 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

User terminals 115 may be dispersed throughout the wireless communications system 100, and each user terminal 115 may be stationary or mobile. A user terminal may be any device capable of transmitting signals to a satellite. Examples of a user terminal may include a UE, relay equipment configured to relay a signal between a satellite and a UE, or a combination thereof. A user terminal 115 may also be referred to as a UE, mobile device, a wireless device, a remote device, a handheld device, or a subscriber device, or some other suitable terminology, where the "device" may also be referred to as a unit, a station, a terminal, or a client. A user terminal 115 may also be a personal electronic device such as a cellular phone, a personal digital assistant (PDA), a tablet computer, a laptop computer, or a personal computer. In some examples, a user terminal 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some user terminals 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some user terminals 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some user terminals 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for user terminals 115 include entering a power saving "deep sleep" mode when not engaging in active communications, or operating over a limited bandwidth (e.g., according to narrowband communications). In some cases, user terminals 115 may be designed to support critical functions (e.g., mission critical functions), and a wireless communications system 100 may be configured to provide ultra-reliable communications for these functions.

In some cases, a user terminal 115 may also be able to communicate directly with other user terminals 115 (e.g., using a peer-to-peer (P2P) or device-to-device (D2D) protocol). One or more of a group of user terminals 115 utilizing D2D communications may be within the geographic coverage area 110 of a base station 105. Other user terminals 115 in such a group may be outside the geographic coverage area 110 of a base station 105, or be otherwise unable to receive transmissions from a base station 105. In some cases, groups of user terminals 115 communicating via D2D communications may utilize a one-to-many (1:M) system in which each user terminal 115 transmits to every other user terminal 115 in the group. In some cases, a base station 105 facilitates the scheduling of resources for D2D communications. In other cases, D2D communications are carried out between user terminals 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for user terminals 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with user terminals 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to user terminals 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between user terminals 115 and base stations 105, and EHF antennas of the respective devices may be even smaller and more closely spaced than UHF antennas. In some cases, this may facilitate use of antenna arrays within a user terminal 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and user terminals 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or user terminal 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a user terminal 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a user terminal 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a user terminal 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a user terminal 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a user terminal 115). In some examples, the beam direction associated with transmissions along a single beam direction may be determined based at least in in part on a signal that was transmitted in different beam directions. For example, a user terminal 115 may receive one or more of the signals transmitted by the base station 105 in different directions, and the user terminal 115 may report to the base station 105 an indication of the signal it received with a highest signal quality, or an otherwise acceptable signal quality. Although these techniques are described with reference to signals transmitted in one or more directions by a base station 105, a user terminal 115 may employ similar techniques for transmitting signals multiple times in different directions (e.g., for identifying a beam direction for subsequent transmission or reception by the user terminal 115), or transmitting a signal in a single direction (e.g., for transmitting data to a receiving device).

A receiving device (e.g., a user terminal 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or user terminal 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a user terminal 115. Likewise, a user terminal 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the RRC protocol layer may provide establishment, configuration, and maintenance of an RRC connection between a user terminal 115 and a base station 105 or core network 130 supporting radio bearers for user plane data. At the Physical (PHY) layer, transport channels may be mapped to physical channels.

In some cases, user terminals 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200 \ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a user terminal 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by user terminals 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-S-OFDM).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more user terminal-specific control regions or user terminal-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served user terminal 115 may be configured for operating over portions or all of the carrier bandwidth. In other examples, some user terminals 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a user terminal 115 receives and the higher the order of the modulation scheme, the higher the data rate may be for the user terminal 115. In MIMO systems, a wireless communications resource may refer to a combination of a radio frequency spectrum resource, a time resource, and a spatial resource (e.g., spatial layers), and the use of multiple spatial layers may further increase the data rate for communications with a user terminal 115.

Devices of the wireless communications system 100 (e.g., base stations 105 or user terminals 115) may have a hardware configuration that supports communications over a particular carrier bandwidth, or may be configurable to support communications over one of a set of carrier bandwidths. In some examples, the wireless communications system 100 may include base stations 105 and/or user terminals 115 that support simultaneous communications via carriers associated with more than one different carrier bandwidth.

Wireless communications system 100 may support communication with a user terminal 115 on multiple cells or carriers, a feature which may be referred to as carrier aggregation or multi-carrier operation. A user terminal 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by user terminals 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a user terminal 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless communications system 100 may also include one or more satellites 120. Satellite 120 may communicate with base stations 105 and user terminals 115 (such as UEs). Satellite 120 may be any suitable type of communication satellite configured to relay communications between different end nodes in a wireless communication system. Satellite 120 may be an example of a space satellite, a balloon, a dirigible, an airplane, a drone, an unmanned aerial vehicle, and/or the like. In some examples, the satellite 120 may be in a geosynchronous or geostationary earth orbit, a low earth orbit or a medium earth orbit. A satellite 120 may be a multi-beam satellite configured to provide service for multiple service beam coverage areas in a predefined geographical service area. The satellite 120 may be any distance away from the surface of the earth.

In some cases, a cell may be provided or established by a satellite 120 as part of a non-terrestrial network. A satellite 120 may, in some cases, perform the functions of a base station 105, act as a bent-pipe satellite, or may act as a regenerative satellite, or a combination thereof. In other cases, satellite 120 may be an example of a smart satellite, or a satellite with intelligence. A bent-pipe transponder or satellite may be configured to receive signals from ground stations and transmit those signals to different ground stations. In some cases, a bent-pipe transponder or satellite may amplify signals or shift from uplink frequencies to downlink frequencies. A regenerative transponder or satellite may be configured to relay signals like the bent-pipe transponder or satellite, but may also use on-board processing to perform other functions. Examples of these other functions may include demodulating a received signal, decoding a received signal, re-encoding a signal to be transmitted, or modulating the signal to be transmitted, or a combination thereof. For example, a bent-pipe satellite (e.g., satellite 120) may receive a signal from a base station 105 and may relay the signal to a user terminal 115 or base station 105, or vice-versa.

User terminals 115 may include a communications manager 101, which may manage communications in a non-terrestrial network communications system. For a user terminal 115, communications manager 101 may transmit, to a base station 105, a first message indicating a capability of the user terminal 115 (which may be an example of a user terminal) for participating in a configurable acknowledgement process. Communications manager 102 may also receive, from the base station 105, a second message indicative of the configurable acknowledgement process, where the configurable acknowledgement process is based on the capability of the user terminal 115. Communications manager 102 may determine a parameter for the configurable acknowledgement process based on the second message, and may perform the configurable acknowledgement process based on the parameter.

One or more of the base stations 105 may also include a communications manager 102, which may manage communications in a non-terrestrial network communications system. For a base station 105, communications manager 102 may receive, from a user terminal 115 (e.g., a user terminal), a first message indicating a capability of the user terminal 115 to participate in a configurable acknowledgement process. Communications manager 102 may also determine a parameter for the configurable acknowledgement process based on the capability of the user terminal 115, and may transmit to the user terminal 115, a second message that is indicative of the configurable acknowledgement process and the parameter.

Figure 2A:
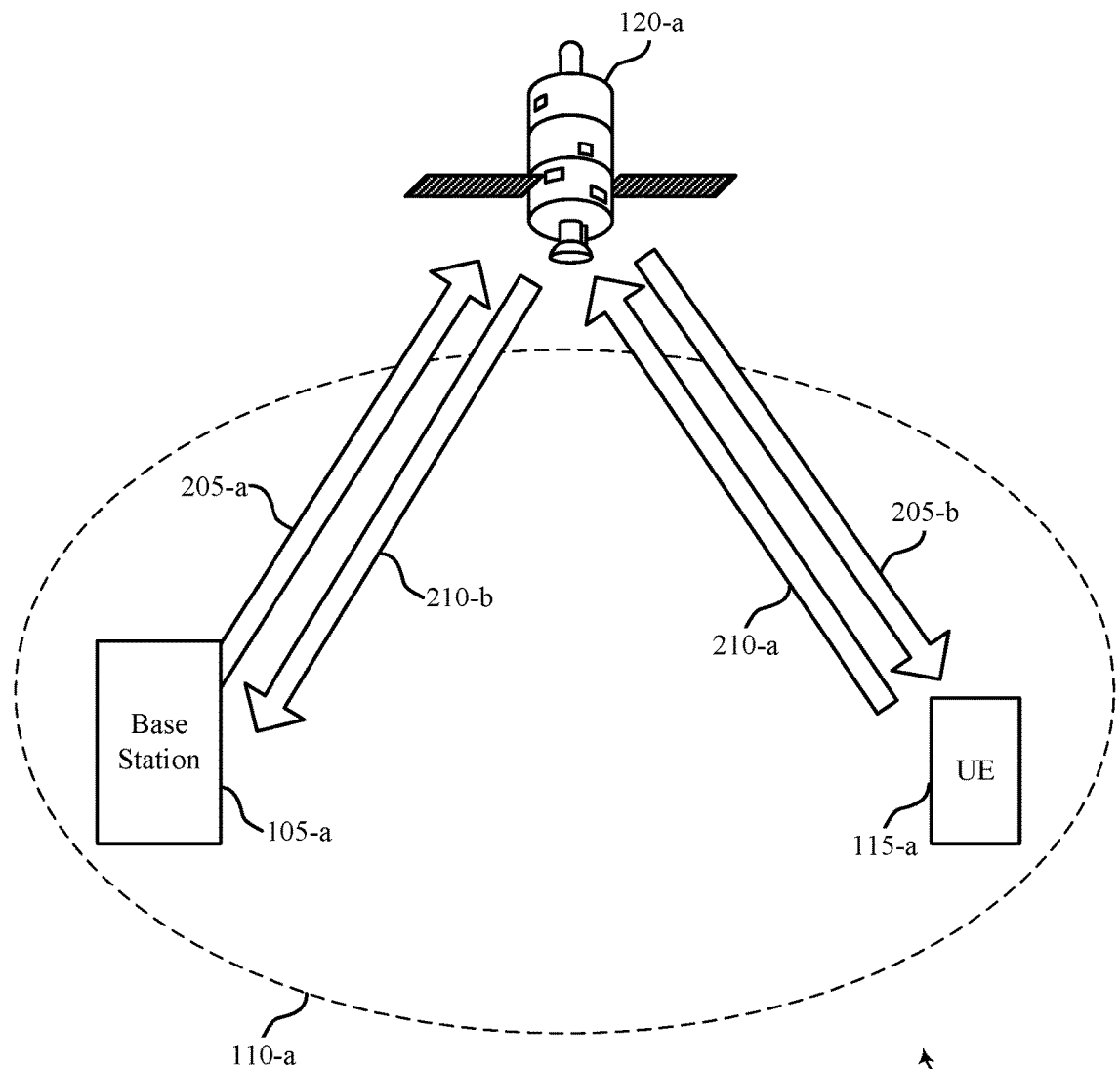
FIG. 2A illustrates an example of a wireless communication system that supports dynamically configurable acknowledgement procedures in accordance with one or more aspects of the present disclosure.

FIG. 2A illustrates an example of a wireless communication system 200 that supports dynamically configurable acknowledgement procedures in accordance with one or more aspects of the present disclosure. In some examples, the wireless communication system 200 may implement aspects of wireless communication system 100.

The wireless communication system 200 may include base station 105-*a*, user terminal 115-*a*, and satellite 120-*a* which may be examples of a base station 105, user terminals 115, and satellites 120 as described with reference to FIG. 1. Base station 105-*a* may be configured to serve a geographic coverage area 110-*a* with the help of the satellite 120-*a*. In some cases, satellite 120-*a* may relay communications between base station 105-*a* and user terminal 115-*a*.

Base station 105-*a* may communicate with user terminal 115-*a* via a satellite 120-*a*. RRC protocol may provide establishment, configuration, and maintenance of the RRC communication between the user terminal 115-*a* and the base station 105-*a* via the satellite 120-*a*. Base station 105-*a* may communicate with user terminal 115-*a* via satellite 120-*a* based on a communication protocol defined in RRC in the control plane. The communication protocol may include HARQ processes that are configurable based on propagation delays of signals communicated between the base station 105-*a* and the user terminal 115-*a*.

For communications originating at the base station 105-*a* and going to the user terminal 115-*a*, the base station 105-*a* may transmit an uplink message 205-*a* to the satellite 120-*a*. The uplink message may be transmitted as a first uplink message 205-*a* to satellite 120-*a*. The satellite 120-*a* may relay the uplink message 205-*a* as a first downlink message 205-*b* to the user terminal 115-*a*.

For communications originating at the user terminal 115-*a* and going to the base station 105-*a*, the user terminal 115-*a* may transmit an uplink message 210-*a* to the satellite 120-*a*. The satellite 120-*a* may relay uplink message 210-*a* as downlink message 210-*b* to base station 105-*b*.

Some messages communicated between the base station 105-*a* and the user terminal 115-*a* may use one or more HARQ processes as part of error detection and correction for the messages. A HARQ process may include a message transmission and a response including an acknowledgement (ACK) or a negative acknowledgement (NACK) message. For example, base station 105-*a* may transmit a message 205 via satellite 120-*a* to user terminal 115-*a*. User terminal 115-*a* may respond by transmitting an ACK or a NACK message to base station 105-*a* in transmission 210 via satellite 120-*a*. A HARQ process may include a quantity of retransmissions and responses. In some cases, HARQ processes may be configured with a maximum quantity of retransmissions after which the HARQ process is deemed complete whether the message was successfully decoded or not.

In some cases, satellite 120-*a* may be in an orbit, such as low earth orbit, medium earth orbit, or geostationary earth orbit. In any of these cases, the satellite may be many thousands of kilometers from earth, and therefore may be thousands of kilometers from base station 105-*a* and user terminal 115-*a*. Each transmission or message 205 or 210 between the base station 105-*a* and the user terminal 115-*a* may therefore travel from earth the distance to the satellite 120-*a* and back to earth. The distance that a transmission travels may increase the propagation delay of a transmission or round trip delay associated with the transmission. The propagation delay may refer to a duration it takes for a signal to travel from its source to its intended recipient. The round trip delay may refer to a duration it takes for a signal to transmitted from a source to its intended recipient, processed by the intended recipient, and a response transmitted from the intended recipient of the first message back to the source.

When satellite 120-*a* is in a low-earth orbit, the satellite may be between 600 km to 1500 km from earth. In the case of a low earth orbit location of satellite 120-*a*, the round trip delay for base station 105-*a* to receive an ACK/NACK from user terminal 115-*a* after transmitting an initial message may be on the order of 8 milliseconds (ms). If satellite 120-*a* is at an altitude of 1200 km, the round trip delay may be up to 40 ms. Further, in cases where satellite 120-*a* may be in a geostationary earth orbit, the round trip delay between a base station 105-*a* and a user terminal 115-*a* may be up to 600 ms. For comparison, in a terrestrial cell not using a satellite to relay a message, a round trip delay between a base station 105-*a* and a user terminal 115-*a* that are 100 km apart may be on the order of 333 microseconds (μs). HARQ processes may be dynamically or semi-statically configurable to addresses related to such large propagation delays and round trip times.

Figure 2B:
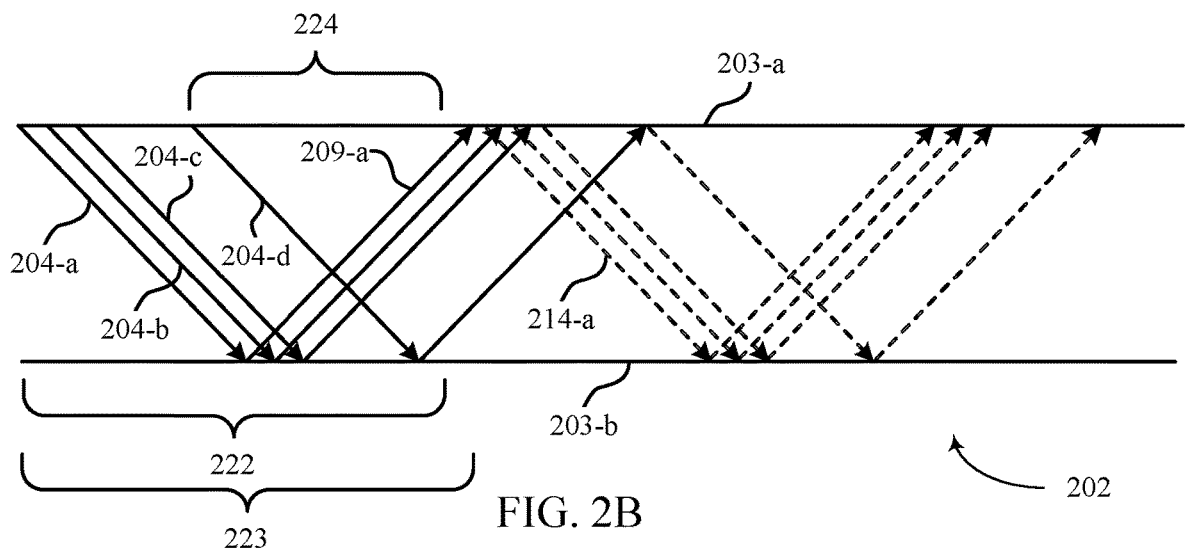
FIG. 2B illustrates an example of a transmission diagram that supports dynamically configurable acknowledgement procedures in accordance with one or more aspects of the present disclosure.

FIG. 2B illustrates an example of a transmission diagram 202 that supports dynamically configurable acknowledgement procedures in accordance with one or more aspects of the present disclosure. In some examples, the transmission diagram 202 may implement aspects of wireless communication systems 100 or 200.

Diagram 202 may be a representation of communications between a base station 105-a and a user terminal 115-a. For example, reference line 203-a may represent a source node of a network (e.g., base station 105-a or user terminal 115-a depending on the communication) and reference line 203-b may represent an intended recipient node of a network (e.g., base station 105-a or user terminal 115-a depending on the communication).

A base station 105 and a user terminal 115 may communicate messages via a relaying satellite 120. Some messages may use one or more HARQ processes to improve the reliability of the messages. In a HARQ process, the communications system may be configured so that the initiating device (e.g., a base station 105 transmitting an initial HARQ message and expecting an ACK/NACK response) may expect to transmit at least one message and receive at least one uplink message. For a HARQ process associated with a single transmission, in some cases, a base station 105-a or a user terminal 115-a that initiated a first HARQ transmission may not begin a second HARQ transmission (or sometimes referred to as a HARQ retransmission) until it has received the ACK/NACK message associated with the first HARQ transmission. Due to the long round trip delay corresponding to wireless communications including a relay satellite 120, a HARQ window associated with the ACK/NACK may be quite long in duration, which can cause communication delays.

For example, the delayed reception of an ACK/NACK in a HARQ process may disrupt the operations of timers in the transmission control protocol (TCP). For instance, the TCP may analyze the delay as related to network congestion and not necessarily as related to a round trip delay caused by the distance between the satellite and the transmitting and receiving devices (e.g., a base station 105 and a user terminal 115). Because of this incorrect analysis, some transmitted packets may be lost.

Transmission 204-a may represent an initial transmission from base station 105 to user terminal 115. Transmission 204-a may be transmitted to a user terminal 115 via a relaying satellite 120. Transmission 209-a may represent the ACK/NACK message from a user terminal 115 to base station 105 based on transmission 204. Transmission 209-a may be transmitted to a base station 105 via a relaying satellite 120. Transmission 204-a may be transmitted by a base station 105 in a first HARQ window 222. Duration 223 may be a representation of the round trip delay from the initial transmission of transmission 204-a by a base station 105 and the reception of the ACK/NACK 209-a by the base station 105, after transmission of the ACK/NACK from user terminal 115-a.

In many cases including HARQ communications relayed by a satellite 120 between base station 105 and user terminal 115, the HARQ window 222 may be shorter than the duration 223 of the round trip delay. Therefore, in these cases, transmission 209-a may be received by a base station 105 from user terminal 115 after the end of the first HARQ window 222. As the HARQ windows lengthen out, it increases a likelihood that the user terminal may want to transmit a HARQ transmission, but cannot because other HARQ processes are not yet resolved or finished. This may delay further communications, because the next transmission, 214-a, may not be transmitted by base station 105-a until after the ACK/NACK 209-a is received. Therefore, the transmission 214-a may be delayed, causing yet further delays for the communications. These delays may propagate throughout further transmissions and may cause latency and packet loss in the communications system.

Further, such large round trip delays can increase the quantity of HARQ processes the user terminal 115-a may want to maintain in parallel. For each HARQ process, the user terminal 115-a may maintain a buffer to store information related to the HARQ process. In some cases, the user terminal 115-a may be configured to support a maximum quantity of HARQ processes (e.g., a maximum quantity of HARQ buffers). Such large round trip times may cause the user terminal 115-a to be operating all of maximum quantity of HARQ processes and still want to send additional messages that use HARQ.

Due to the limitations of the configuration designating four HARQ retransmissions, a duration 224 that is not used for any transmission to or from a base station 105 or a user terminal 115. Transmissions 204-b, 204-c, and 204-d may be retransmissions of initial transmission 204-a. Round trip delay may also occur in systems without a relaying satellite 120. For example, if a base station 105 and a user terminal 115 are far apart, there may be a long round trip delay between them that may cause similar delays and communications latencies.

Figure 3A:
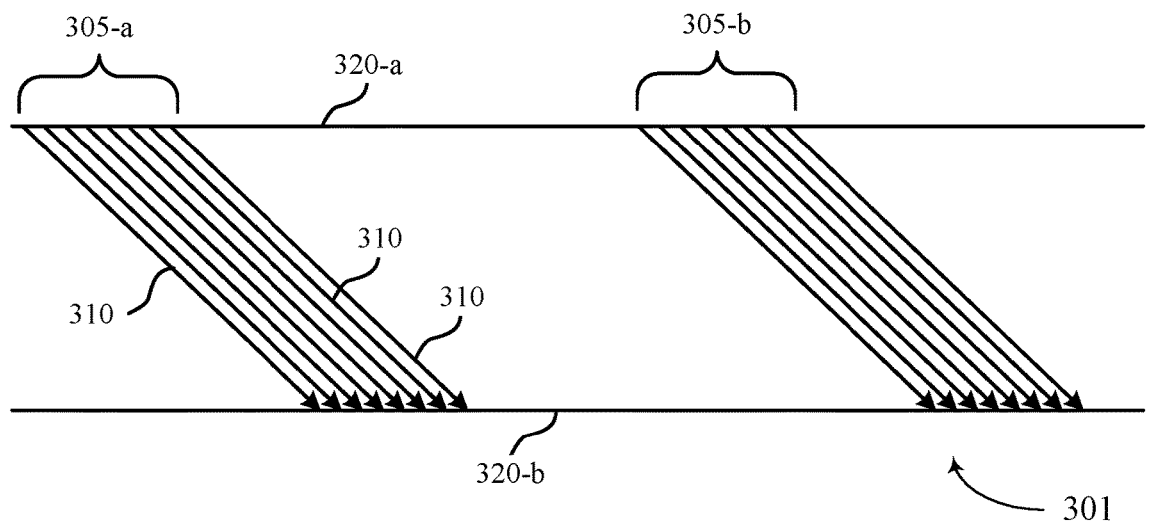
FIGS. 3A through 3C illustrate examples of transmission diagrams that support dynamically configurable acknowledgement procedures in accordance with one or more aspects of the present disclosure.
Figure 3B:
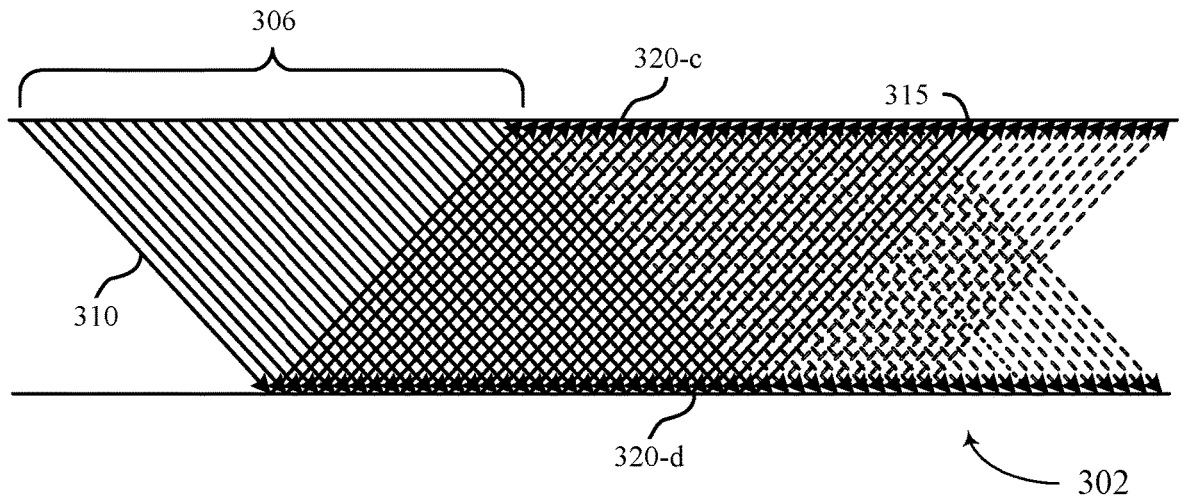
Figure 3C:
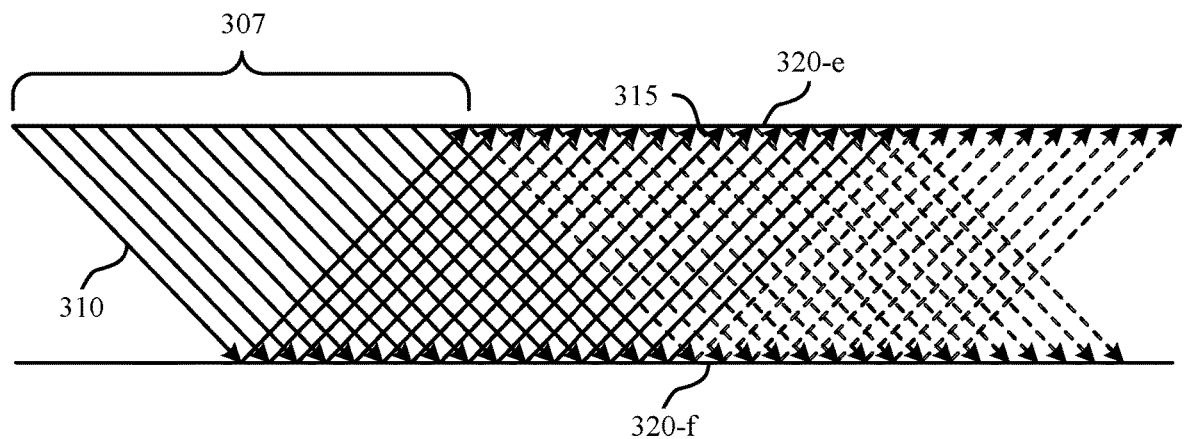

FIGS. 3A through 3C illustrate different configurations for HARQ processes for addressing networks that include increase round trip delay times. Each figure illustrates one or more parameters of a HARQ process that may be configurable (e.g., dynamically or semi-statically) to be used in networks that include increased round trip delay times. The features and techniques described with reference FIGS. 3A through 3C may be combined in various ways to establish a HARQ process or HARQ procedure that works for a given network.

FIG. 3A illustrates an example of a transmission diagram 301 that supports dynamically configurable acknowledgement procedures in accordance with aspects of the present disclosure. In some examples, the transmission diagram 301 may implement aspects of wireless communication systems 100 and 200.

Diagram 301 illustrates situations where HARQ retransmissions may be disabled or a maximum quantity of HARQ retransmissions may be limited. For example, the network (e.g., base station 105-a) may dynamically or semi-statically select a maximum quantity of HARQ retransmissions used by a HARQ process. Diagram 301 may include reference line 320-a, which represents a source (e.g., a base station 105-a or a user terminal 115-a) that transmits a communication, and a reference line 320-b, which represents an intended recipient (e.g., a base station 105-a or a user terminal 115-a) of the communication.

In some cases, the configuration of HARQ retransmissions may be disabled. In such cases, every transmission 310 between a source and an intended recipient carries unique data (e.g., there are no HARQ retransmissions being transmitted). In some implementations, disabling HARQ may be done a user terminal-by-user terminal basis. In some implementations, disabling HARQ may be done on a cell-by-cell basis.

In some cases, a maximum quantity of HARQ retransmissions may be configurable for a HARQ process. For example, in some wireless systems, the maximum quantity of HARQ retransmissions may be three (e.g., a total of four transmissions for a message including the original transmission). The maximum quantity of HARQ retransmissions may be selectable between 0, 1, 2, 3, 4, 5, 6, 7, 8 etc. quantity of HARQ retransmissions.

When signaling that HARQ is disabled or a maximum quantity of HARQ retransmissions, a base station 105-$a$ may use RRC signaling. For example, the base station 105-$a$ may transmit an RRC signal that semi-statically disables HARQ. In some cases, the base station 105-$a$ may transmit downlink control information (DCI) that enables or disables HARQ, sometimes temporarily. In some implementations, the disabling or enabling of HARQ processes may be done using a single bit in the message. In some implementations, RRC signaling may be used to semi-statically configure HARQ with a maximum allowed quantity of HARQ retransmissions and DCI may be configured to temporarily disable HARQ processes.

Signaling of HARQ disabling or signaling the maximum quantity of HARQ retransmissions may be accomplished using a variety of different indicators. In some cases, HARQ disabling or signaling the maximum quantity of HARQ retransmissions may be indicated using a single bit. In some cases, HARQ disabling or signaling the maximum quantity of HARQ retransmissions may be indicated using more than one bit. In some cases, HARQ disabling or signaling the maximum quantity of HARQ retransmissions may be indicated using a reserved HARQ identifier. When using a reserved HARQ identifier, both the base station 105-$a$ and the user terminal 115-$a$ may be configured to know a HARQ configuration associated with the reserved HARQ identifier.

In some cases, there may be an increased limitation on the maximum number of HARQ retransmissions per HARQ process. For example, the maximum number of HARQ retransmissions may be zero, one, two, or three retransmissions. In many cases, sixteen (16) HARQ processes may be configured to be operated in parallel, with each HARQ process allotted up to four HARQ transmissions (e.g., up to three HARQ retransmission including the original transmission).

In other cases, the HARQ disabling configuration may be signaled dynamically through DCI transmitted to a user terminal 115 by a base station 105. The DCI may indicate the temporary override of the HARQ process, which may include an increase limitation on the number of message retransmissions. The DCI indicating the temporary override and disabling of HARQ may occur in the initial message transmitted from base station 105 to user terminal 115.

Disabling HARQ or reducing a maximum quantity of HARQ retransmissions may be managed by the base station 105-$a$ using signaling related to buffers. After transmitting a message (whether the first message or some subsequent retransmission), the base station 105-$a$ may transmit a command to flush or terminate the HARQ process. In some cases, the command to flush or terminate the HARQ process may occur in a downlink message in the new data indicator (NDI) of the downlink message. In some cases, the command to flush a buffer or terminate the HARQ process may include a code block group transmission information (CBGTI) indicator, a code block group flushing out information (CBGFI) indicator, or a combination thereof. When user terminal 115-$a$ receives the indication to flush a buffer or terminate the HARQ process, user terminal 115-$a$ may execute the received command. In some cases, the user terminal 115-$a$ may transmit an ACK/NACK that the buffer has been flushed or that the HARQ process is terminated.

In some cases, HARQ may be disabled to avoid excessive delays between the first transmission and subsequent retransmissions when the round trip delay time is large. RRC signaling may be used to semi-statically configure HARQ to be disabled, and DCI may temporarily enable HARQ to function with a single bit. In some cases, RRC signaling may be used to semi-statically disable HARQ, and DCI may temporarily enable HARQ to function with a section number of retransmissions based on one or more bits. In some cases, RRC signaling may be used to semi-statically configure HARQ with a certain number of allowed retransmissions based on a number of bits, and DCI may temporarily disable HARQ with a single bit or with a reserved HARQ ID. The configuration of the number of retransmissions may occur through RRC or MAC-CE configuration signaling.

A base station 105 may terminate the HARQ process at any point in throughout the communication. A base station 105 may terminate the HARQ using an NDI, CBGTI, CBGFI, or a combination thereof. Terminating the HARQ process may reduce the number of retransmissions of HARQ or may disable the HARQ process completely in order to include more initial transmissions based on the timing of when the base station 105-$a$ sends such indicators.

To address issues related to reducing the maximum quantity of HARQ transmission or disabling HARQ complete, a base station may target a lower block error rate (BLER) with a transmission. To lower a BLER of the initial transmission (or subsequent transmission, as the case may be), the base station may use a different modulation and coding scheme (MCS). In some cases, a different MCS table may be used for different HARQ configurations. A base station 105-$a$ may use a lower MCS when the maximum quantity of HARQ retransmissions is limited than the MCS that is used for a standard maximum quantity of HARQ retransmissions. For example, a base station 105 may negatively offset one or more channel quality indicators to indicate a lower MCS selection. A base station 105 indicating a reduced retransmission configuration or a disabled HARQ process may also indicate or include a specific MCS table for this type of HARQ process. A lower BLER may increase accurate transmissions, because in this configuration there are fewer or no retransmissions. Thus, a lower BLER may aid in accuracy in communication configurations where there may be little or no redundancy. In cases where this communications configuration includes retransmissions, the retransmissions may instead be handled by radio link control (RLC) layer, rather than in a HARQ retransmission process.

FIG. 3B illustrates an example of a transmission diagram 302 that supports dynamically configurable acknowledgement procedures in accordance with aspects of the present disclosure. In some examples, the transmission diagram 302 may implement aspects of wireless communication systems 100 and 200.

Diagram 302 illustrates situations where a maximum quantity of HARQ processes may be configurable (e.g., increased). For example, the network (e.g., base station 105-$a$) may dynamically or semi-statically select a maximum quantity of HARQ processes running in parallel to be supported based on a capability of the user terminal. Diagram 302 may include reference line 320-$c$, which represents a source (e.g., a base station 105-$a$ or a user terminal 115-$a$) that transmits a communication, and a reference line 320-$d$, which represents an intended recipient (e.g., a base station 105-$a$ or a user terminal 115-$a$) of the communication.

In circumstances where the network identifies that round trip delay times may adversely impact HARQ processes, the network may increase a maximum quantity of HARQ processes that are capable of being run in parallel. The quantity of HARQ processes may be limited by the capabilities of the user terminal. For example, the quantity of HARQ processes running in parallel may be limited by a quantity of buffers for HARQ processes the user terminal may maintain at one time. The maximum quantity of HARQ processes running in parallel may be dynamically or semi-statically configurable based on the propagation delay or the round trip delay time. The number of HARQ processes may be increased to fill the gap caused by the round trip delay.

The user terminal 115-a may transmit a message that includes the capabilities of the user terminal. The base station 105-a may select a maximum quantity of HARQ processes that may run in parallel based on receiving the message from the user terminal 115-a indicating its capabilities.

An example of such techniques may be illustrated by diagram 302. Within a first HARQ window 306, the maximum quantity of HARQ processes within the slot may be increased. For example, in some wireless communication systems, up to sixteen (16) parallel HARQ processes may be supported, but the maximum quantity of parallel HARQ processes for the HARQ window 306 may be greater than sixteen. Transmissions 310 represent HARQ transmission from a source to an intended recipient and transmissions 315 represent responses.

The base station 105-a and the user terminal 115-a may adjust processes to be able to distinguish between the greater quantity of HARQ processes running in parallel. In some cases, a HARQ identifier field in control signaling (e.g., DCI) may be expanded to be more than four bits. In such cases, the base station 105-a or the user terminal 115-a may be configured to identify a HARQ process using the expanding HARQ identifier (e.g., more than four bits). In some cases, a size of the HARQ identifier field in the control information (e.g., DCI) may be configured (e.g., a bit-width change).

In some cases, a quantity of identifiable HARQ processes running in parallel may be increased while maintaining the HARQ identifier field bit width. HARQ processes may be identifiable based on a HARQ identifier (e.g., that is equal to or less than four bits) and at least one of a slot number, a time, or a subframe count. In effect, the HARQ process may be indexed by the HARQ identifier and at least one of the slot number, the time, or the subframe count. An example of such an indexing is described herein.

The HARQ identifier field or HARQ identifier may be configured to be four or fewer bits. To maintain the size HARQ identifier field or HARQ identifier while increasing the quantity of HARQ processes running in parallel, the HARQ identifier fields or HARQ identifiers may be grouped into a quantity of groups of HARQ identifiers. Each group of HARQ identifiers may be indexed using the slot number, the time, or the subframe count. In this manner, a single HARQ identifier may be configured to refer to more than one unique HARQ process based on the indexing value (e.g., the slot number, the time, or the subframe count) associated with the HARQ identifier. The transmitting device (e.g., base station 105-a) may cycle through HARQ identifiers in a group and then move to the next group and cycle through those HARQ identifiers. For example, a first slot may be associated with a first group of HARQ identifiers and a second slot may be associated with a second group of HARQ identifiers different than the first group. HARQ identifiers may be reused between the two groups but the base station 105-a and the user terminal 115-a may be configured to identify the HARQ process using both the HARQ identifier and the indexing value, in this case the slot number.

After the quantity of groups have been cycled through, the HARQ procedures may start reusing the HARQ identifiers from previous groups. In the example described below there are two groups of HARQ identifiers. Subsequent slots may cycle through the HARQ groups. For example, as shown in Table 1, a first slot may be associated with a first group, a second slot may be associated with a second group, and a third slot may again be associated with the first group, and so forth. The index value may be a function of time, system frame number (SFN) or subframe count, or a combination. In some cases, a HARQ process may be identified based on the following equation:

$$\text{HARQ ID in DCI} + ((\text{SubframeNo.} \times 2^H \times 10 + \text{SlotNo.}) \mod k) \times 16 = \text{HARQ process} \quad (1)$$

Here, the k may represent a quantity of groups of HARQ identifiers

Table 1 may be an example of the results from using the above equation to identify a HARQ process. For example, as shown in Table 1, a first slot may be associated with a first group, a second slot may be associated with a second group, and a third slot may again be associated with the first group, and so forth. For example, when k equals 2, the following table may represent the quantity of HARQ processes corresponding to the number of HARQ processes in a slot. In this HARQ configuration, the quantity of HARQ processes running in parallel may be increased.

TABLE 1

| HARQ ID Looping Table | | | | | | | | |
|---|---|---|---|---|---|---|---|---|
| HARQ 0-15 | HARQ 16-31 | HARQ 0-15 | HARQ 16-31 | HARQ 0-15 | HARQ 16-31 | HARQ 0-15 | HARQ 16-31 | HARQ 0-15 |

The quantity of HARQ processes running parallel may affect a quantity of ACK/NACK bits that may be grouped into a single transmission. In downlink communications from the base station 105-a to the user terminal 115-a, the single transmission may be an example of a physical uplink control channel (PUCCH) transmission or a physical uplink shared channel (PUSCH) transmission. In some cases, this may lead to a large size for ACK/NACK payloads in such signals. In some cases, the size of the ACK/NACK payload may be limited to what can fit in existing wireless communications systems. In some cases, the base station 105-a may be configured to dynamically or semi-statically modify a maximum size of ACK/NACK payload in signals. For example, a base station 105-a may configure the number of ACK/NACK bits to be coded, or rate matched, or both in one PUCCH or PUSCH transmission based on the type of communications system (e.g., 4G, 5G, LTE, NR, non-terrestrial network etc.).

FIG. 3C illustrates an example of a transmission diagram 303 that supports dynamically configurable acknowledgement procedures in accordance with aspects of the present disclosure. In some examples, the transmission diagram 303 may implement aspects of wireless communication systems 100 and 200.

Diagram 303 illustrates situations where a size of transmissions associated with HARQ processes may be configurable to fill a propagation delay window. Such situations may be used where a maximum quantity of HARQ processes running in parallel cannot be increased any further. Diagram 303 may include reference line 320-e, which represents a source (e.g., a base station 105-a or a user terminal 115-a) that transmits a communication, and a reference line 320-f, which represents an intended recipient (e.g., a base station 105-a or a user terminal 115-a) of the communication.

A size of a HARQ transmission may be expanded to reduce the amount of time lost due to propagation dely. The size of the HARQ transmission may be dynamically configurable or semi-static configurable. In some cases, a HARQ transmission may span multiple slots. A size of the transport block (TB) for the HARQ transmission may be enlarged. In some cases, code blocks from multiple TBs may be grouped and then the grouped code blocks may be transmitted over multiple slots.

When configuring the size of HARQ transmission, the base station 105-a may also use different MCS values as compared to the MCS values for standard HARQ transmission sizes. In some cases, additional MCS table entries in an MCS table may be used for the multiple-slot HARQ configuration. In some cases, a different MCS table may be used for the multiple-slot HARQ configuration. The base station 105-a may be configured to communicate the updated MCS table or communicate an indication of which MCS table is being used as part of configuring the size of the HARQ transmissions. The MCS values used for such configurations may be configured to target a lower coding rate or a lower BLER. In some cases, retransmission may still be delayed even with code block group (CBG) based retransmission. Such cases may also include the introduction of different time domain configurations for the allocation in DCI for the scheduling of uplink and downlink between the user terminal and the base station.

Parameters of the HARQ processes for such configurations may include the size of the HARQ transmission, an indicator that the HARQ transmission may span more than one slot, an indicator related to code block grouping, an indicator about the MCS values or MCS table, the MCS table, or a combination thereof. The configuration may also include an indicator of the size of the TB associated with the HARQ transmission. The size of the HARQ transmission may be configured to fill a propagation delay window associated with a round trip delay of the configurable ACK/NACK process.

For example, a plurality of HARQ transmissions 310 may be transmitted from a source to an intended recipient via a relaying satellite 120 during a delay window 307. The delay window 307 may represent a duration between transmitting a message and receiving response 315 associated with that message. The size of each HARQ transmission of the plurality of HARQ transmissions 310 transmitted during the delay window may be selected based on the round trip delay. In such configurations, the size of the HARQ transmissions may be selected such that at least one HARQ process will resolve before the maximum quantity of parallel HARQ processes is exceeded. The response 315 (e.g., ACK/NACK) may be transmitted by user terminal 115-a via a relaying satellite 120 to base station 105-a. The size of the response 315 may also be configurable.

Figure 4:
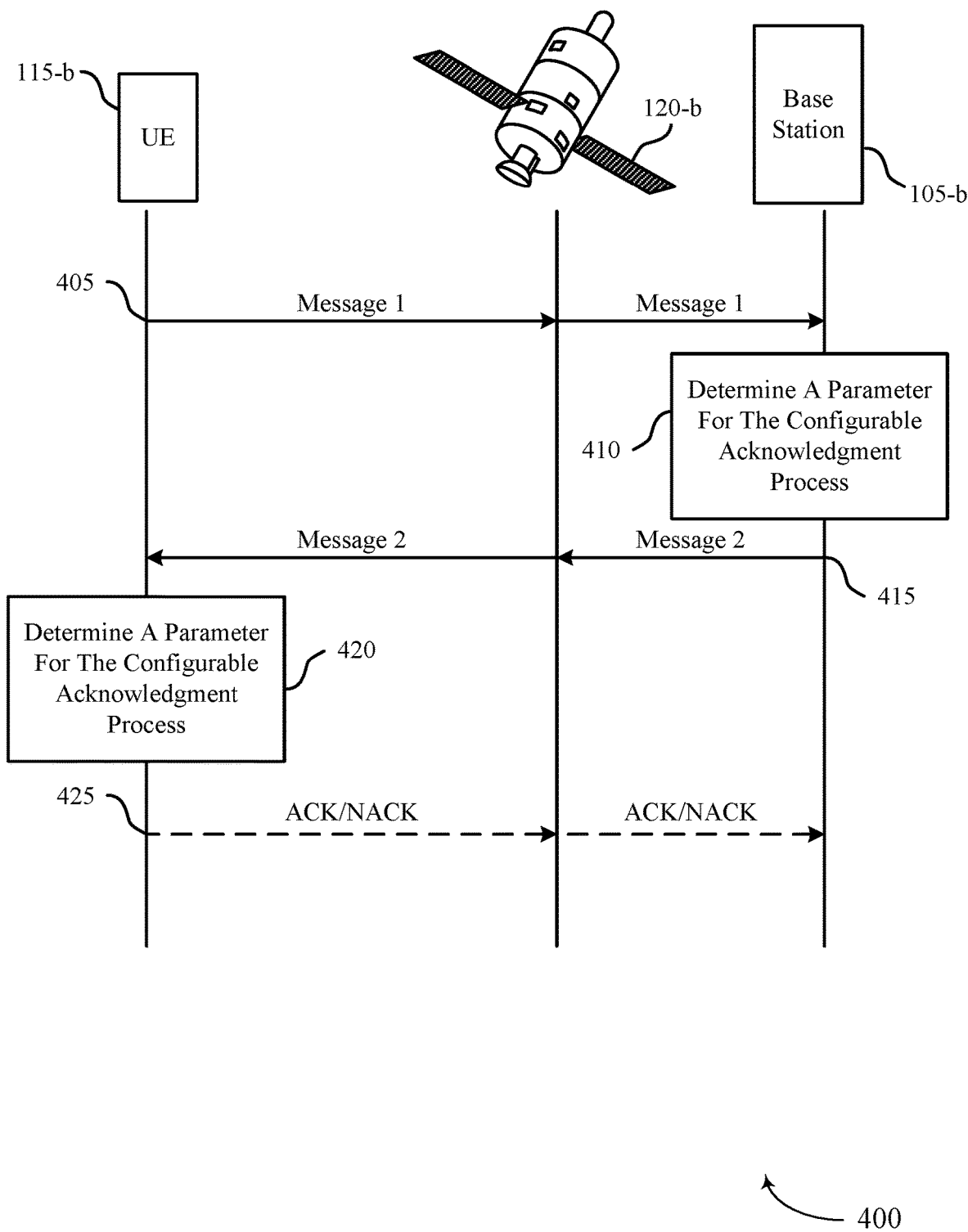
FIG. 4 illustrates an example of a process flow that supports dynamically configurable acknowledgement procedures in accordance with one or more aspects of the present disclosure.

FIG. 4 illustrates an example of a process flow 400 that supports dynamically configurable acknowledgement procedures in accordance with one or more aspects of the present disclosure. In some examples, the process flow 400 may implement aspects of wireless communication systems 100 and 200. Process flow 400 may illustrate communication between base station 105-b, user terminal 115-b and satellite 120-b. Base station 105-b, user terminal 115-b, and satellite 120-b each may be examples of a base station 105, user terminals 115, and satellites 120 as described with reference to FIG. 1 and FIG. 2A.

At 405, user terminal 115-b may transmit, to base station 105-b, a first message indicating a capability of user terminal 115-b for participating in a configurable ACK process. The first message may be transmitted to base station 105-b via a relaying satellite 120-b. Base station 105-b may receive the first message from user terminal 115-b At 410, base station 105-b may determine a parameter for the configurable acknowledgement process (e.g., a HARQ process) based on the capability of user terminal 115-b. Examples of the configurable parameter may include a maximum quantity of retransmissions for each HARQ process, whether HARQ is disabled, a maximum quantity of HARQ processes running in a parallel, a size of a HARQ transmission, or a combination thereof.

At 415, user terminal 115-b may receive, from base station 105-b, a second message that indicates one or more parameters about the acknowledgement process. The configurable acknowledgement process may be based on the capability of user terminal 115-b. Base station 105-b may transmit the second message via relaying satellite 120-b.

In some cases, the second message may include RRC signaling configured to disable the HARQ retransmissions. In other cases, the second message may include DCI including information configured to disable the HARQ retransmissions. The second message may also include a system information block.

At 420, user terminal 115-b may determine a parameter for the configurable acknowledgement process based on the second message. The user terminal 115-b may identify that a wireless communication link for communicating the second message associated with the configurable ACK process is part of a non-terrestrial network. The user terminal 115-b may determine the parameter based on identifying that the wireless communication link is part of the non-terrestrial network. The user terminal 115-b may determine that a round trip delay associated with the configurable ACK process between base station 105-b and user terminal 115-b may satisfy a threshold, user terminal 115-b may determine that the parameter is based on determining that the round trip delay satisfies the threshold. The user terminal 115-b may identify that a propagation delay window between transmitting a message and receiving an ACK or NACK satisfies a threshold. The user terminal 15-b may determine the parameter based on determining that the propagation delay window satisfies the threshold. Determining the parameters may also further include reducing a quantity of maximum HARQ retransmission allowed during the configurable ACK process based on receiving the second message. The parameter may include the quantity of maximum HARQ retransmissions. user terminal 115-b may also identify MCS information associated with the quantity of maximum HARQ retransmissions. In some cases, performing the configurable ACK process may be based on identifying the MCS.

Determining the parameter may also include user terminal 115-b determining to disable HARQ retransmissions associated with one or more messages. In some cases, the parameter may indicate that a quantity if maximum HARQ retransmissions is equal to zero. In other cases, the quantity of maximum HARQ retransmissions may be equal to more than zero.

The user terminal 115-*b* may identify a HARQ identifier that indicates the HARQ retransmissions are disabled based on user terminal 115-*b* receiving the second message. The second message may include the identified HARQ identifier.

The user terminal 115-*b* may flush one or more buffers associated with the configurable ACK process based on receiving the second message. The second message may include an indicator to cause user terminal 115-*b* to flush the one or more buffers associated with the configurable ACK process. The indicator may include a new data indicator (NDI), a code block transmission information (CBGTI) indicator, a conde block group flushing out information (CBGFI) indicator, or a combination of the two. The second message may also include a HARQ ACK configured to cause user terminal 115-*b* to flush a buffer associated with the configurable ACK process.

In other cases, determining the parameter may include user terminal 115-*b* determining a quantity of parallel HARQ processes between base station 105-*b* and user terminal 115-*b*. In some cases, the quantity of parallel HARQ processes is greater than sixteen HARQ processes. The first message may also indicate a quantity of buffers that user terminal 115-*b* is configurable to use for parallel HARQ processes. Further, the quantity of parallel HARQ processes may be based on the quantity of buffers. The second message may include a HARQ identifier which may have five or more bits.

The user terminal 115-*b* may identify a HARQ identifier and at least one of a slot number, a time, or a subframe count. User terminal 115-*b* may also identify a first HARQ process of the quantity of parallel HARQ processes based on the HARQ identifier and at least one or the slot number, the time, or the subframe count. Base station 105-*b* may transmit the second message based on identifying the first HARQ process. A first HARQ process of the quantity of parallel HARQ processes is indexed by a HARQ identifier and at least one of a slot number, a time, or a subframe count.

The user terminal 115-*b* may configure a quantity of ACK or NACK bits included in a single message that is associated with the quantity of parallel HARQ processes. User terminal 115-*b* may transmit the single message with the quantity of ACK or NACK bits based on receiving the second message for base station 105-*b*.

In other cases, user terminal 115-*b* may determine the parameter by determining that a HARQ transmission spans more than one slot, where the parameter may comprise a size of the HARQ transmission. User terminal 115-*b* may determine a size of a transport block associated with the HARQ transmissions. User terminal 115-*b* may determine that the HARQ transmission spans more than one slot based on determining the size of the transport block. User terminal 115-*b* may receive one or more grouped code blocks from multiple TBs over multiple slots. In this case, the size of the HARQ transmission may be configured to fill a propagation delay window associated with a round trip delay of the configurable acknowledgment process.

At 425, user terminal 115-*b* may transmit a response message (e.g., an ACK/NACK message) as part of the acknowledgment process.

Figure 5:
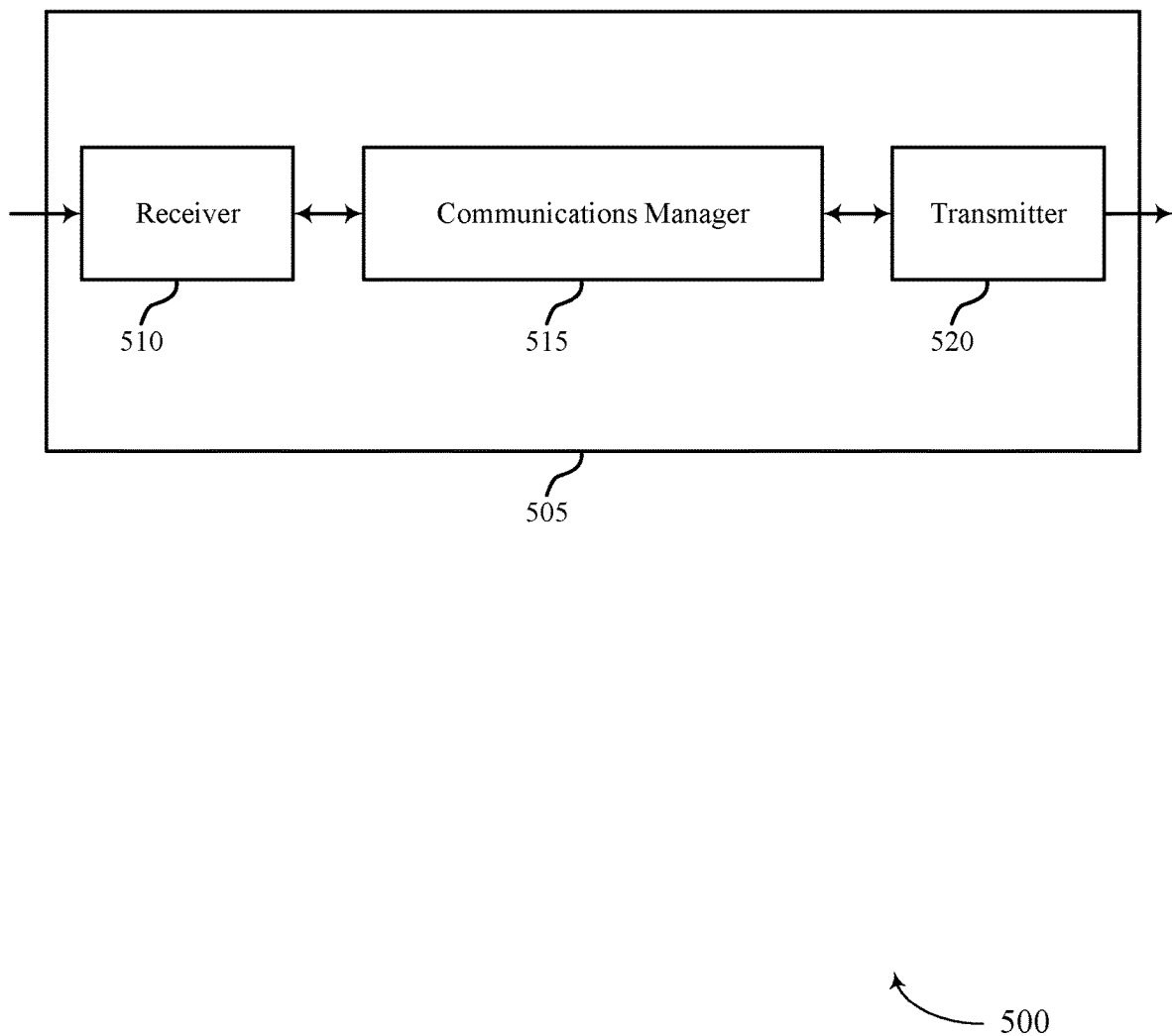
FIGS. 5 and 6 show block diagrams of devices that support dynamically configurable acknowledgement procedures in accordance with one or more aspects of the present disclosure.

FIG. 5 shows a block diagram 500 of a device 505 that supports dynamically configurable acknowledgement procedures in accordance with one or more aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to dynamically configurable acknowledgement procedures, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive, from a base station, a message indicative of a configurable HARQ process that is configurable on a per-HARQ process basis, determine a parameter for the configurable HARQ process based on the message, and perform the configurable HARQ process based on the parameter. The communications manager 515 may also receive, at the user terminal, a message indicative of a maximum quantity of parallel HARQ processes supported between a base station and the user terminal, determine, from the message, the maximum quantity of parallel HARQ processes supported between the base station and the user terminal, and perform one or more HARQ processes based on the maximum quantity. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
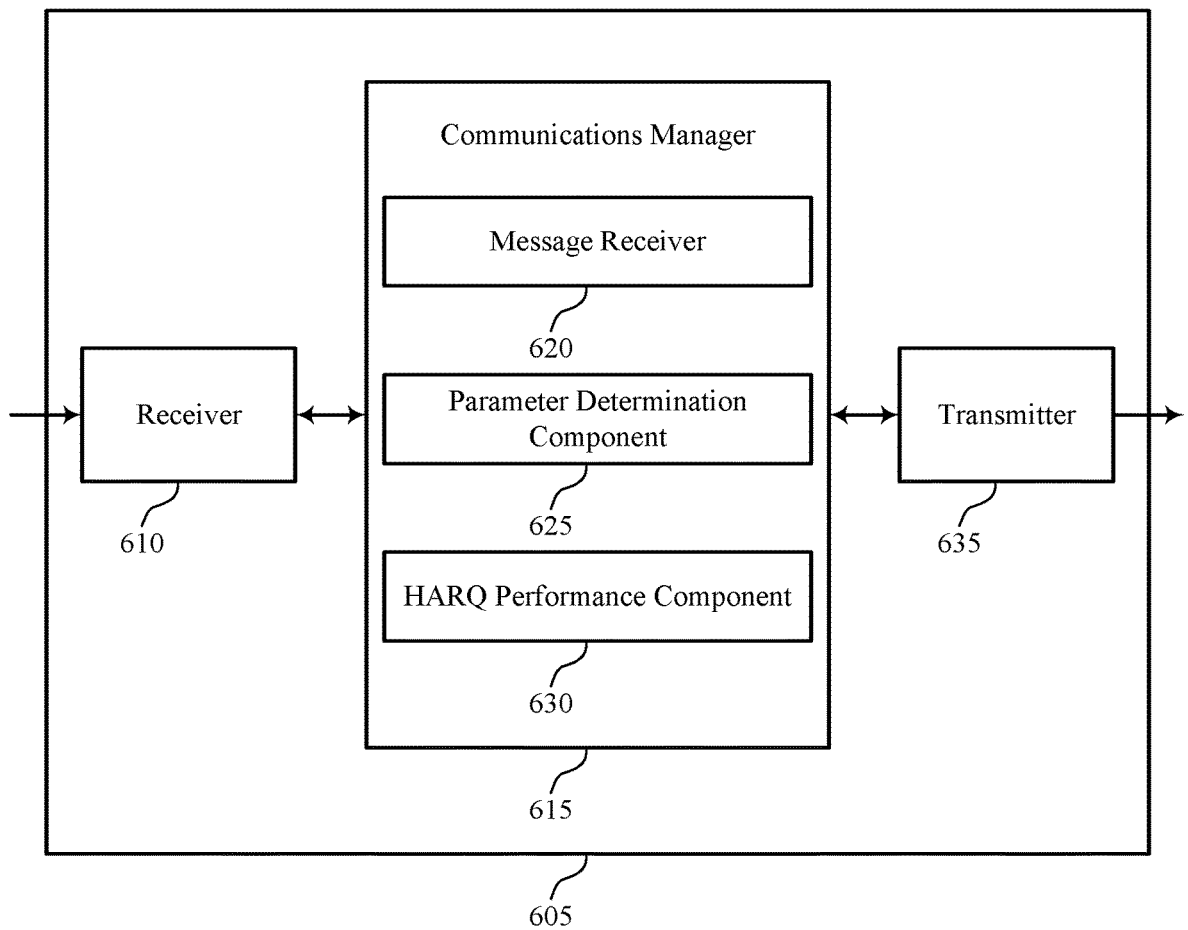

FIG. 6 shows a block diagram 600 of a device 605 that supports dynamically configurable acknowledgement procedures in accordance with one or more aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to dynamically configurable acknowledgement procedures, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a message receiver 620, a parameter determination component 625, and a HARQ performance component 630. The communications manager 615 may be an example of aspects of the communications manager 810 described herein.

The message receiver 620 may receive, from a base station, a message indicative of a configurable HARQ process that is configurable on a per-HARQ process basis. The parameter determination component 625 may determine a parameter for the configurable HARQ process based on the message. The HARQ performance component 630 may perform the configurable HARQ process based on the parameter.

The message receiver 620 may receive, at the user terminal, a message indicative of a maximum quantity of parallel HARQ processes supported between a base station and the user terminal. The parameter determination component 625 may determine, from the message, the maximum quantity of parallel HARQ processes supported between the base station and the user terminal. The HARQ performance component 630 may perform one or more HARQ processes based on the maximum quantity.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
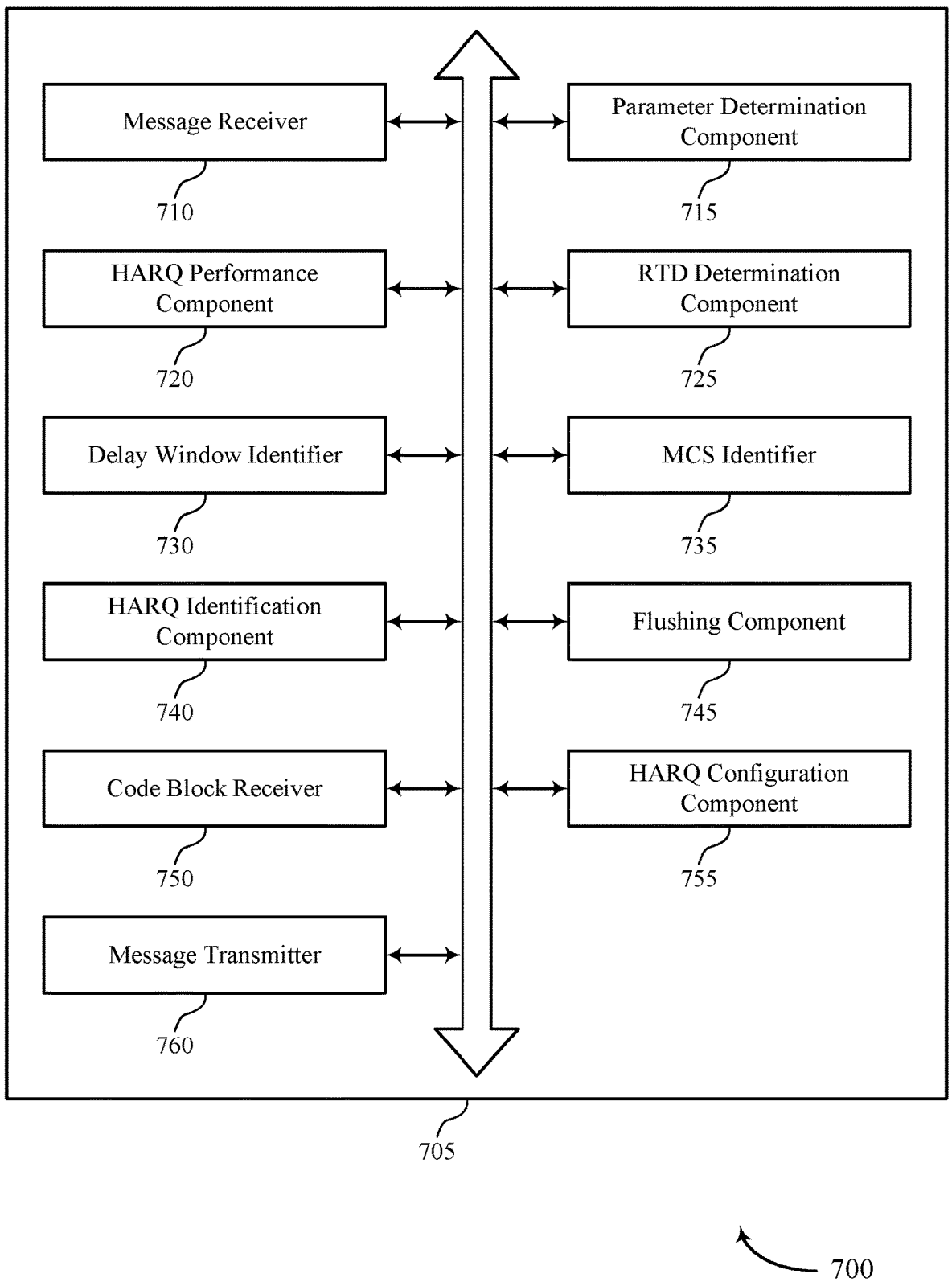
FIG. 7 shows a block diagram of a communications manager that supports dynamically configurable acknowledgement procedures in accordance with one or more aspects of the present disclosure.

FIG. 7 shows a block diagram 700 of a communications manager 705 that supports dynamically configurable acknowledgement procedures in accordance with one or more aspects of the present disclosure. The communications manager 705 may be an example of aspects of a communications manager 515, a communications manager 615, or a communications manager 810 described herein. The communications manager 705 may include a message receiver 710, a parameter determination component 715, a HARQ performance component 720, a RTD determination component 725, a delay window identifier 730, a MCS identifier 735, a HARQ identification component 740, a flushing component 745, a code block receiver 750, a HARQ configuration component 755, and a message transmitter 760. Each of these modules may communicate, directly or indirectly, with one another (e.g., via one or more buses).

The message receiver 710 may receive, from a base station, a message indicative of a configurable HARQ process that is configurable on a per-HARQ process basis. In some examples, the message receiver 710 may receive, at the user terminal, a message indicative of a maximum quantity of parallel HARQ processes supported between a base station and the user terminal. In some cases, the message is received via a communication link in a non-terrestrial network, and where determining the parameter is based on the wireless communication link being a part of the non-terrestrial network.

The parameter determination component 715 may determine a parameter for the configurable HARQ process based on the message. In some examples, the parameter determination component 715 may determine, from the message, the maximum quantity of parallel HARQ processes supported between the base station and the user terminal. In some examples, the parameter determination component 715 may reduce a quantity of maximum HARQ retransmissions allowed during the configurable HARQ process based on receiving the message. In some examples, the parameter determination component 715 may determine to disable one or more features of the HARQ process associated with one or more transport blocks. In some examples, determining that a HARQ transmission spans more than one slot, where the parameter includes a size of the HARQ transmission.

In some cases, the parameter indicates whether HARQ combining is used for performing the configurable HARQ process. In some cases, the parameter indicates that a positive acknowledgement or a negative acknowledgement will follow a data transmission. In some cases, the message is received via RRC signaling or in a SIB. In some cases, the maximum quantity of parallel HARQ processes is based on a quantity of buffers the user terminal is configurable to use for parallel HARQ processes.

The HARQ performance component 720 may perform the configurable HARQ process based on the parameter. In some examples, the HARQ performance component 720 may perform one or more HARQ processes based on the maximum quantity.

The RTD determination component 725 may determine that a round trip delay associated with the configurable HARQ process between the base station and the user terminal satisfies a threshold, where determining the parameter is based on determining that the round trip delay satisfies the threshold. The delay window identifier 730 may determine that a propagation delay window between transmitting a transport block and receiving a positive acknowledgement or negative acknowledgement satisfies a threshold, and where determining the parameter is based on determining that the propagation delay window satisfies the threshold. The MCS identifier 735 may perform the configurable HARQ process is based on the modulation and coding scheme information associated with a quantity of maximum HARQ processes.

The HARQ identification component 740 may identify a HARQ identifier and at least one of a slot number, a time, or a subframe count. In some examples, the HARQ identification component 740 may identify a first HARQ process of the quantity of parallel HARQ processes based on the HARQ identifier and at least one of the slot number, the time, or the subframe count, where transmitting the message is based on identifying the first HARQ process. In some cases, the HARQ process is disabled based on receiving the message, where the message includes an identified HARQ process identifier. In some cases, a first HARQ process of the quantity of parallel HARQ processes is indexed by a HARQ identifier and at least one of a slot number, a time, or a subframe count.

The flushing component 745 may flush one or more buffers associated with the configurable HARQ process based on receiving the message, where the message includes an indicator to cause the user terminal to flush the one or more buffers associated with the configurable HARQ process. The code block receiver 750 may receive one or more grouped code blocks from the transport block over multiple slots. The HARQ configuration component 755 may configure a quantity of acknowledgement or negative acknowledgement bits included in a single message that is associated with the quantity of parallel HARQ processes. The message transmitter 760 may transmit the single message with the quantity of acknowledgement or negative acknowledgement bits based on receiving the message.

Figure 8:
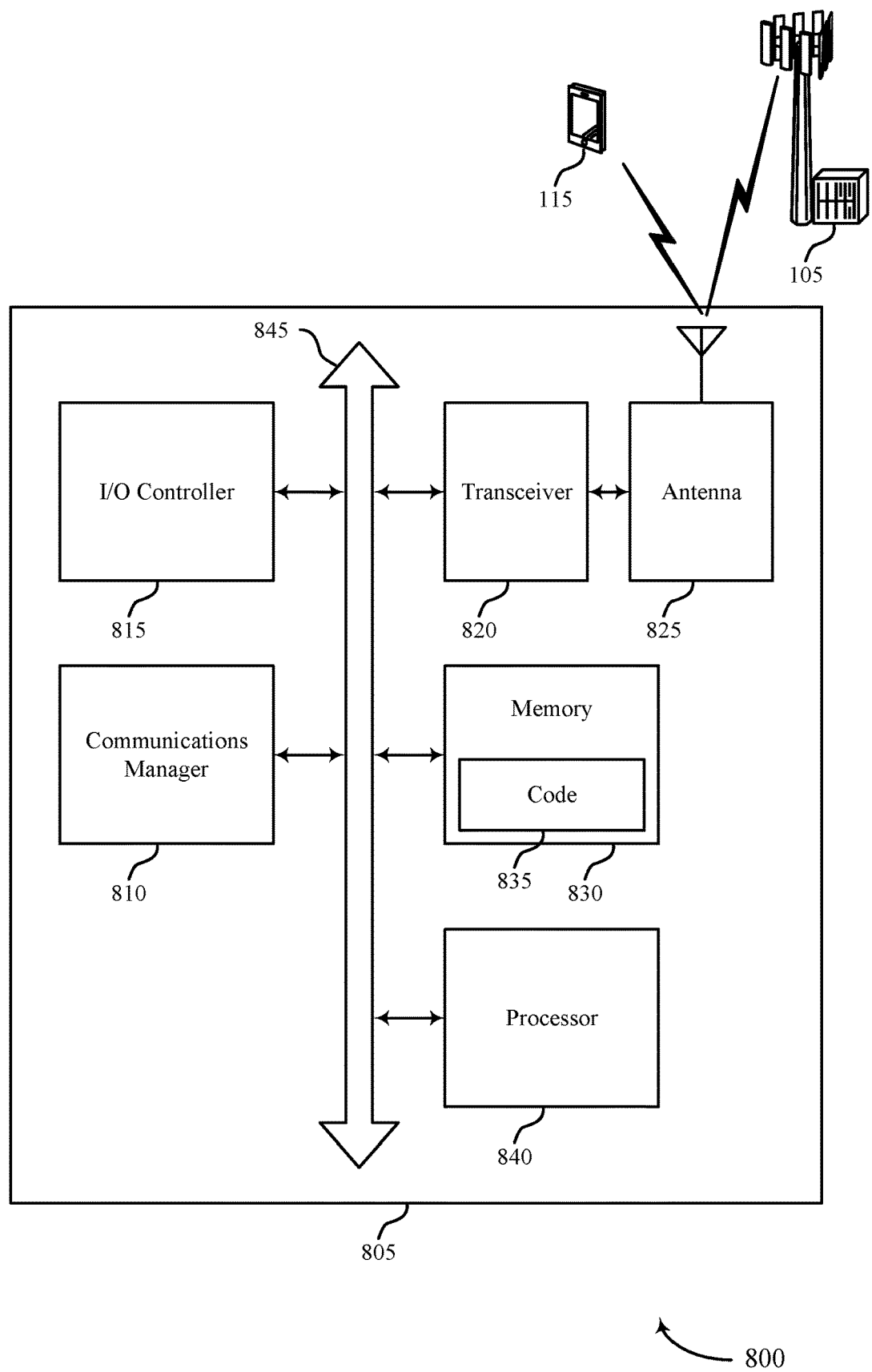
FIG. 8 shows a diagram of a system including a device that supports dynamically configurable acknowledgement procedures in accordance with one or more aspects of the present disclosure.

FIG. 8 shows a diagram of a system 800 including a device 805 that supports dynamically configurable acknowledgement procedures in accordance with one or more aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive, from a base station, a message indicative of a configurable HARQ process that is configurable on a per-HARQ process basis, determine a parameter for the configurable HARQ process based on the message, and perform the configurable HARQ process based on the parameter. The communications manager 810 may also receive, at the user terminal, a message indicative of a maximum quantity of parallel HARQ processes supported between a base station and the user terminal, determine, from the message, the maximum quantity of parallel HARQ processes supported between the base station and the user terminal, and perform one or more HARQ processes based on the maximum quantity.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting dynamically configurable acknowledgement procedures).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
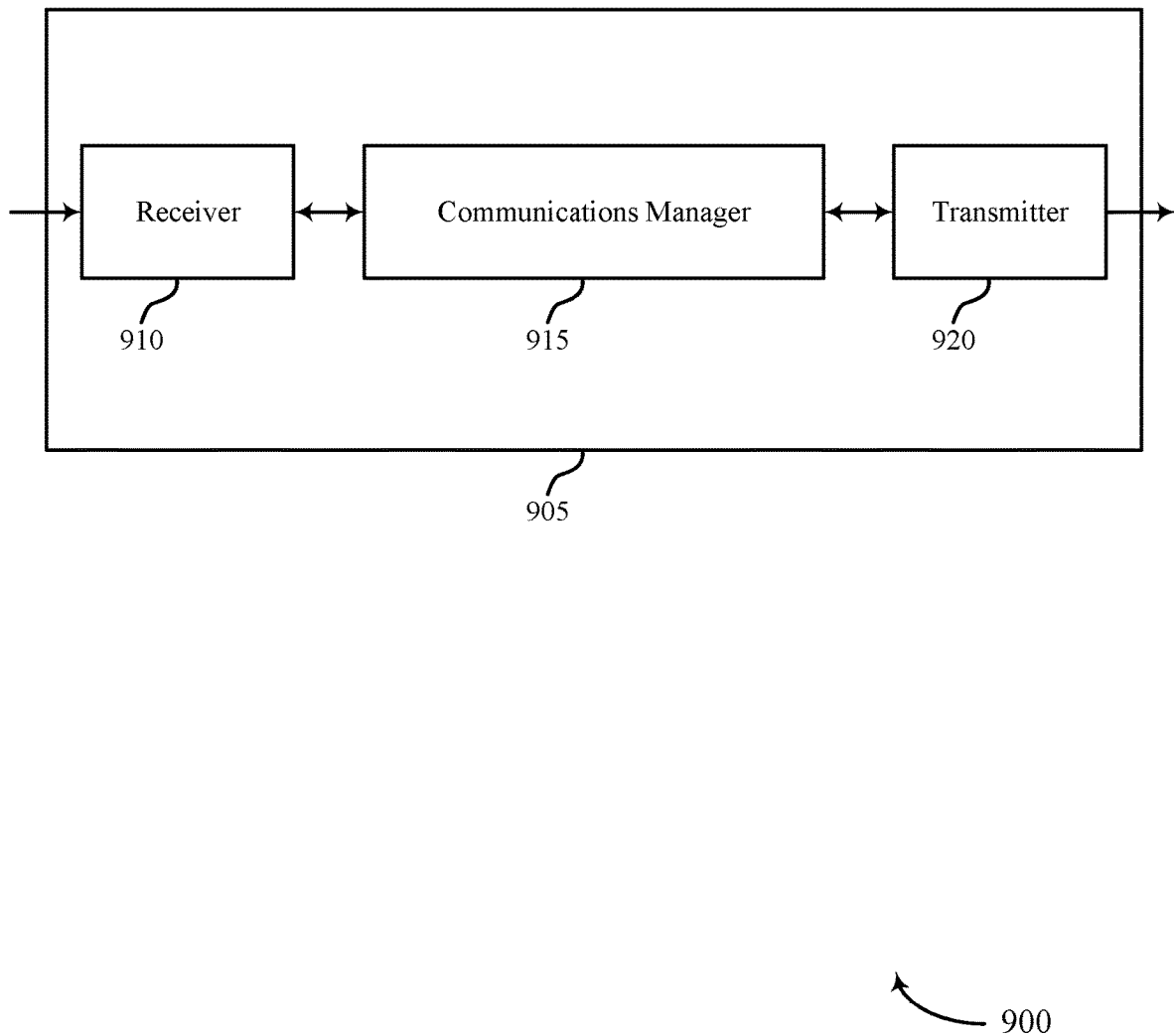
FIGS. 9 and 10 show block diagrams of devices that support dynamically configurable acknowledgement procedures in accordance with one or more aspects of the present disclosure.

FIG. 9 shows a block diagram 900 of a device 905 that supports dynamically configurable acknowledgement procedures in accordance with one or more aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to dynamically configurable acknowledgement procedures, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may determine a parameter for a configurable HARQ process that is configurable on a per-HARQ process basis for a user terminal and transmit, to the user terminal, a message that is indicative of the configurable HARQ process and the parameter. The communications manager 915 may also transmit, to a user terminal, a message indicative of a maximum quantity of parallel HARQ processes supported between the base station and the user terminal, determine, from the message, the maximum quantity of parallel HARQ processes supported between the base station and the user terminal, and perform one or more HARQ processes according to the maximum quantity. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
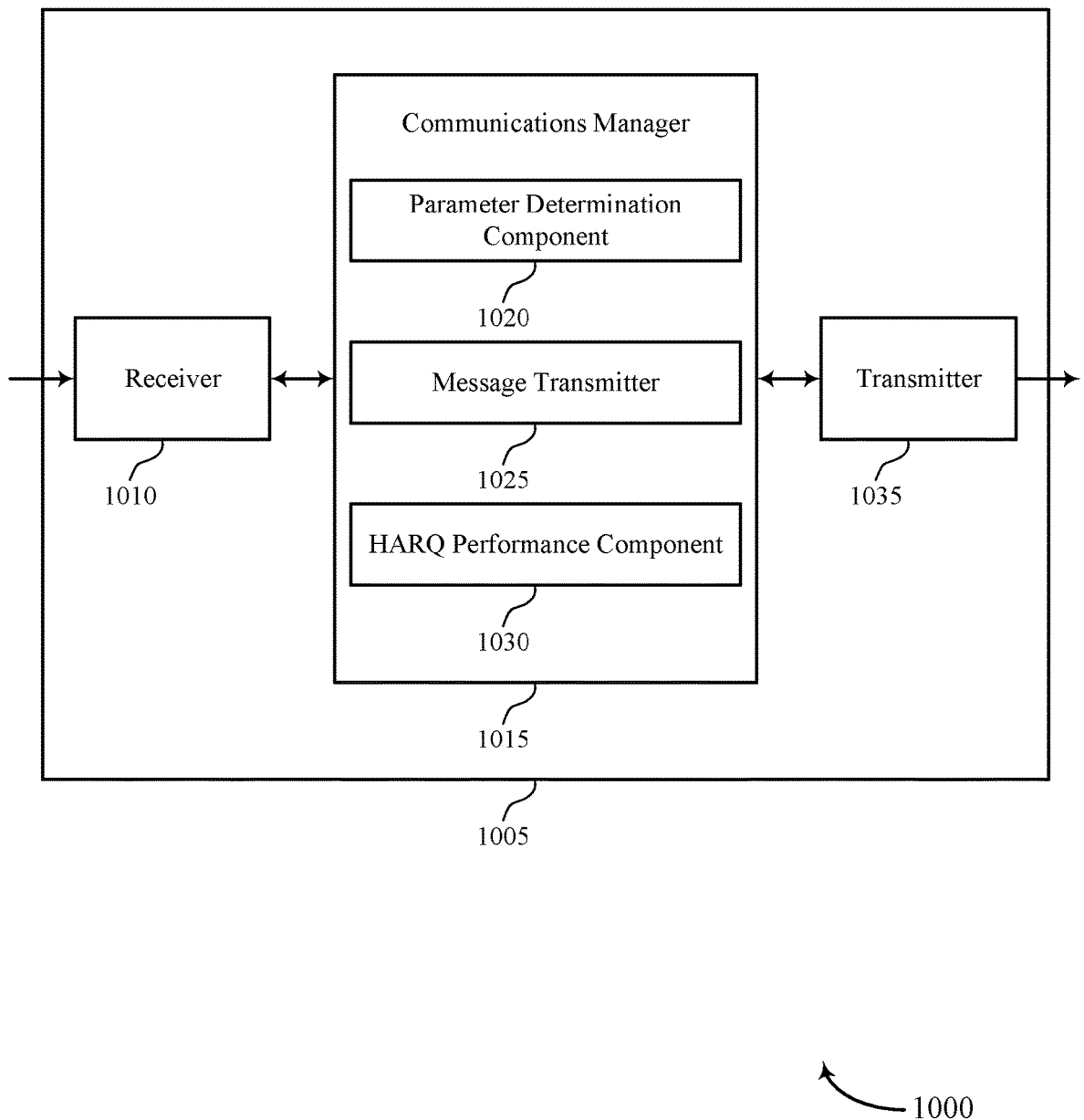

FIG. 10 shows a block diagram 1000 of a device 1005 that supports dynamically configurable acknowledgement procedures in accordance with one or more aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to dynamically configurable acknowledgement procedures, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a parameter determination component 1020, a message transmitter 1025, and a HARQ performance component 1030. The communications manager 1015 may be an example of aspects of the communications manager 1210 described herein.

The parameter determination component 1020 may determine a parameter for a configurable HARQ process that is configurable on a per-HARQ process basis for a user terminal.

The message transmitter 1025 may transmit, to the user terminal, a message that is indicative of the configurable HARQ process and the parameter.

The message transmitter 1025 may transmit, to a user terminal, a message indicative of a maximum quantity of parallel HARQ processes supported between the base station and the user terminal.

The parameter determination component 1020 may determine, from the message, the maximum quantity of parallel HARQ processes supported between the base station and the user terminal.

The HARQ performance component 1030 may perform one or more HARQ processes according to the maximum quantity.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
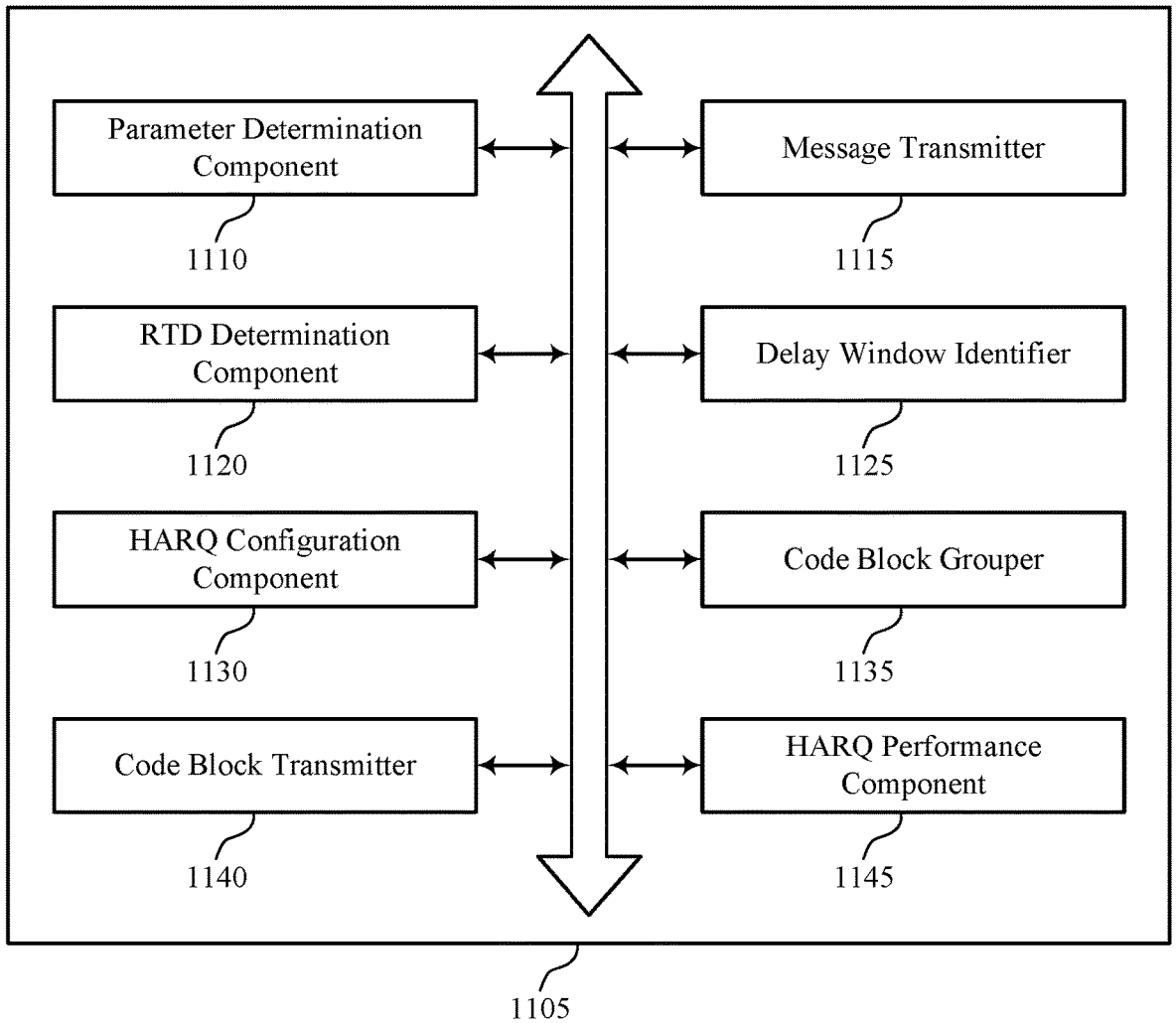
FIG. 11 shows a block diagram of a communications manager that supports dynamically configurable acknowledgement procedures in accordance with one or more aspects of the present disclosure.

FIG. 11 shows a block diagram 1100 of a communications manager 1105 that supports dynamically configurable acknowledgement procedures in accordance with one or more aspects of the present disclosure. The communications manager 1105 may be an example of aspects of a communications manager 915, a communications manager 1015, or a communications manager 1210 described herein. The communications manager 1105 may include a parameter determination component 1110, a message transmitter 1115, a RTD determination component 1120, a delay window identifier 1125, a HARQ configuration component 1130, a code block grouper 1135, a code block transmitter 1140, and a HARQ performance component 1145. Each of these modules may communicate, directly or indirectly, with one another (e.g., via one or more buses).

The parameter determination component 1110 may determine a parameter for a configurable HARQ process that is configurable on a per-HARQ process basis for a user terminal.

In some examples, the parameter determination component 1110 may determine, from the message, the maximum quantity of parallel HARQ processes supported between the base station and the user terminal.

In some examples, the parameter determination component 1110 may determine to disable one or more features of the HARQ process associated with one or more transport blocks.

In some examples, determining that a HARQ transmission spans more than one slot, where the parameter includes a size of the HARQ transmission.

In some cases, the message includes an indicator that causes the user terminal to flush one or more buffers associated with the configurable HARQ process.

The message transmitter 1115 may transmit, to the user terminal, a message that is indicative of the configurable HARQ process and the parameter.

In some examples, the message transmitter 1115 may transmit, to a user terminal, a message indicative of a maximum quantity of parallel HARQ processes supported between the base station and the user terminal.

The HARQ performance component 1145 may perform one or more HARQ processes according to the maximum quantity.

The RTD determination component 1120 may determine that a round trip delay associated with the configurable HARQ process between the base station and the user terminal satisfies a threshold, where determining the parameter is based on determining that the round trip delay satisfies the threshold.

The delay window identifier 1125 may determine that a propagation delay window between transmitting a transport block and receiving a positive acknowledgement or negative acknowledgement satisfies a threshold, and where determining the parameter is based on determining that the propagation delay window satisfies the threshold.

The HARQ configuration component 1130 may disable HARQ processes is done on a per-cell basis.

In some cases, the message includes a HARQ acknowledgement configured to cause the user terminal to flush a buffer associated with the configurable acknowledgement process.

The code block grouper 1135 may group code blocks from multiple transport blocks.

The code block transmitter 1140 may transmit the grouped code blocks over multiple slots.

Figure 12:
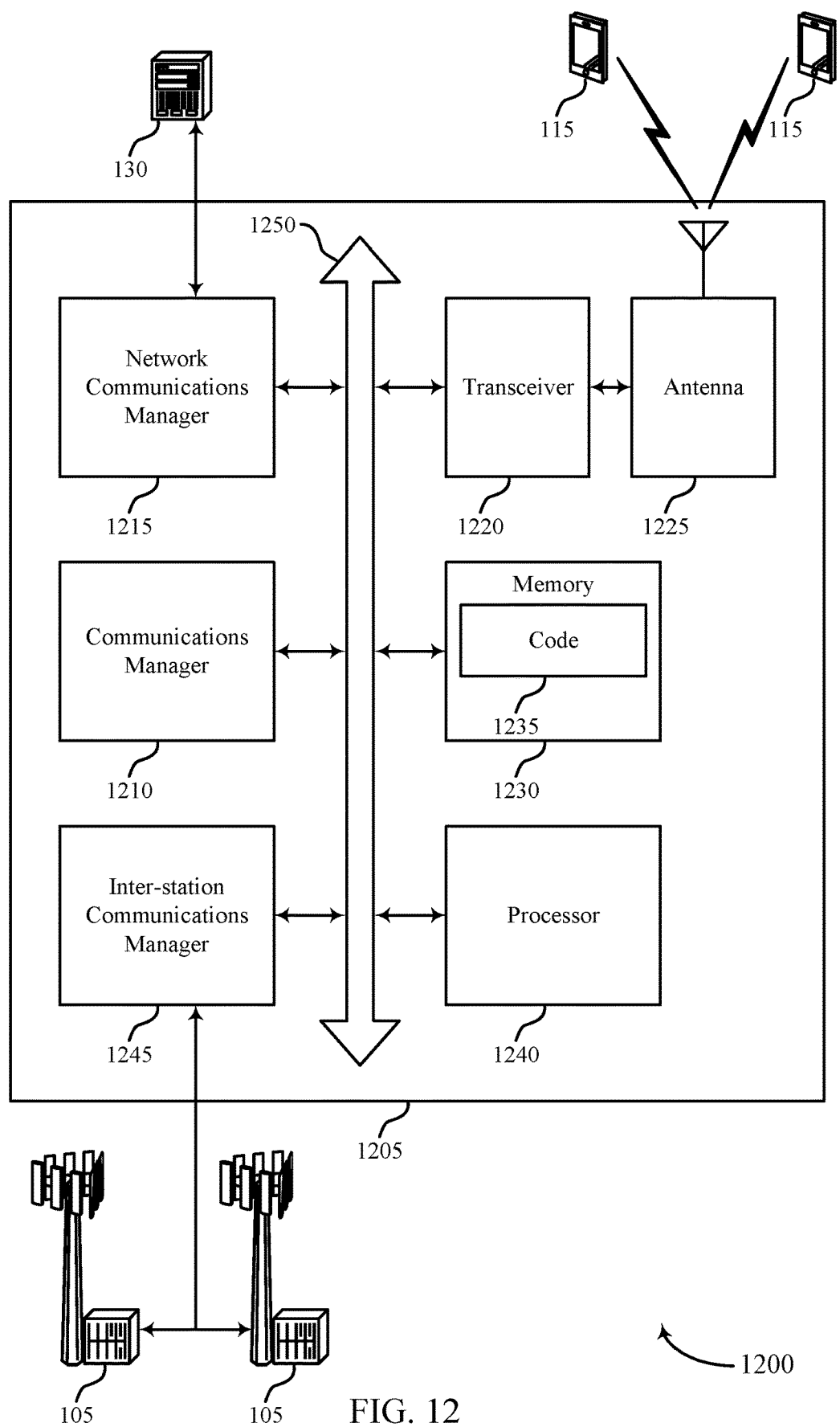
FIG. 12 shows a diagram of a system including a device that supports dynamically configurable acknowledgement procedures in accordance with one or more aspects of the present disclosure.

FIG. 12 shows a diagram of a system 1200 including a device 1205 that supports dynamically configurable acknowledgement procedures in accordance with one or more aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may determine a parameter for a configurable HARQ process that is configurable on a per-HARQ process basis for a user terminal and transmit, to the user terminal, a message that is indicative of the configurable HARQ process and the parameter. The communications manager 1210 may also transmit, to a user terminal, a message indicative of a maximum quantity of parallel HARQ processes supported between the base station and the user terminal, determine, from the message, the maximum quantity of parallel HARQ processes supported between the base station and the user terminal, and perform one or more HARQ processes according to the maximum quantity.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting dynamically configurable acknowledgement procedures).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
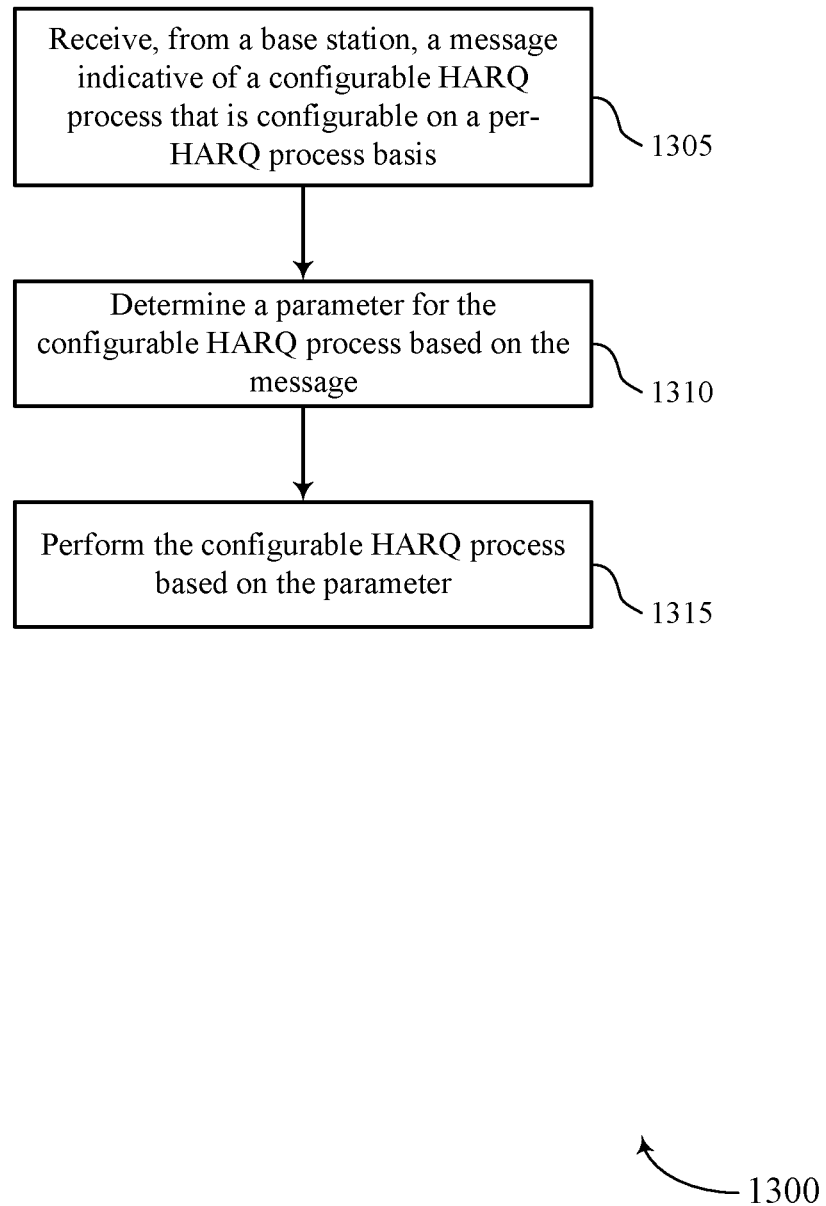
FIGS. 13 through 20 show flowcharts illustrating methods that support dynamically configurable acknowledgement procedures in accordance with one or more aspects of the present disclosure.

FIG. 13 shows a flowchart illustrating a method 1600 that supports dynamically configurable acknowledgement procedures in accordance with one or more aspects of the present disclosure. The operations of method 1600 may be implemented by a UE 115 or its components as described herein. For example, the operations of method 1600 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1605, the UE may receive, from a base station, a message indicative of a configurable HARQ process that is configurable on a per-HARQ process basis. The operations of 1605 may be performed according to the methods described herein. In some examples, aspects of the operations of 1605 may be performed by a message receiver as described with reference to FIGS. 5 through 8.

At 1610, the UE may determine a parameter for the configurable HARQ process based on the message. The operations of 1610 may be performed according to the methods described herein. In some examples, aspects of the operations of 1610 may be performed by a parameter determination component as described with reference to FIGS. 5 through 8.

At 1615, the UE may perform the configurable HARQ process based on the parameter. The operations of 1615 may be performed according to the methods described herein. In some examples, aspects of the operations of 1615 may be performed by a HARQ performance component as described with reference to FIGS. 5 through 8.

Figure 14:
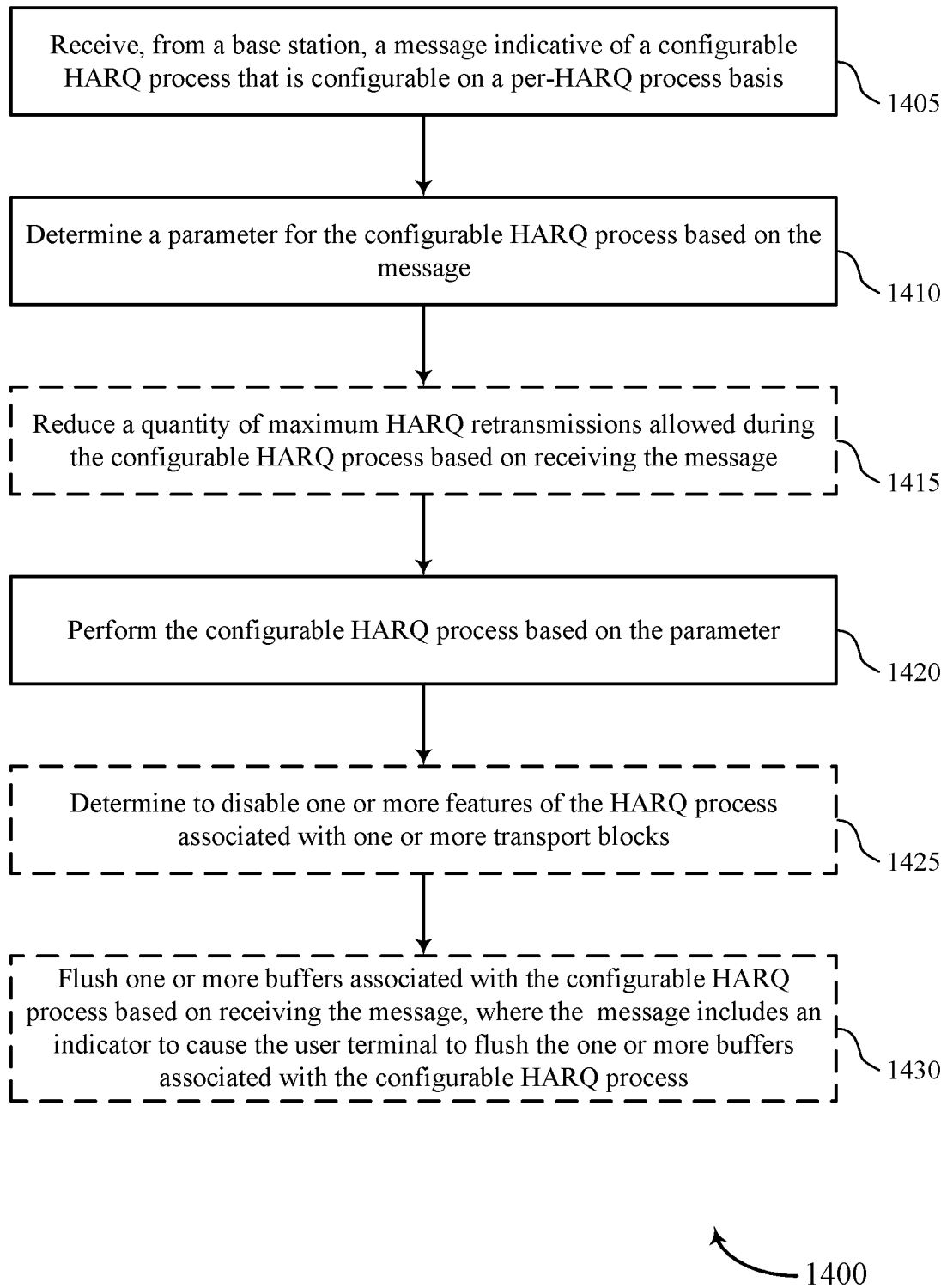

FIG. 14 shows a flowchart illustrating a method 1400 that supports dynamically configurable acknowledgement procedures in accordance with one or more aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive, from a base station, a message indicative of a configurable HARQ process that is configurable on a per-HARQ process basis. The operations of 1405 may be performed according to the methods described herein. In some examples, aspects of the operations of 1405 may be performed by a message receiver as described with reference to FIGS. 5 through 8.

At 1410, the UE may determine a parameter for the configurable HARQ process based on the message. The operations of 1410 may be performed according to the methods described herein. In some examples, aspects of the operations of 1410 may be performed by a parameter determination component as described with reference to FIGS. 5 through 8.

At 1415, the UE may reduce a quantity of maximum HARQ retransmissions allowed during the configurable HARQ process based on receiving the message. The operations of 1415 may be performed according to the methods described herein. In some examples, aspects of the operations of 1415 may be performed by a parameter determination component as described with reference to FIGS. 5 through 8.

At 1420, the UE may perform the configurable HARQ process based on the parameter. The operations of 1420 may be performed according to the methods described herein. In some examples, aspects of the operations of 1420 may be performed by a HARQ performance component as described with reference to FIGS. 5 through 8.

At 1425, the UE may determine to disable one or more features of the HARQ process associated with one or more transport blocks. The operations of 1425 may be performed according to the methods described herein. In some examples, aspects of the operations of 1425 may be performed by a parameter determination component as described with reference to FIGS. 5 through 8.

At 1430, the UE may flush one or more buffers associated with the configurable HARQ process based on receiving the message, where the message includes an indicator to cause the user terminal to flush the one or more buffers associated with the configurable HARQ process. The operations of 1430 may be performed according to the methods described herein. In some examples, aspects of the operations of 1430 may be performed by a flushing component as described with reference to FIGS. 5 through 8.

Figure 15:
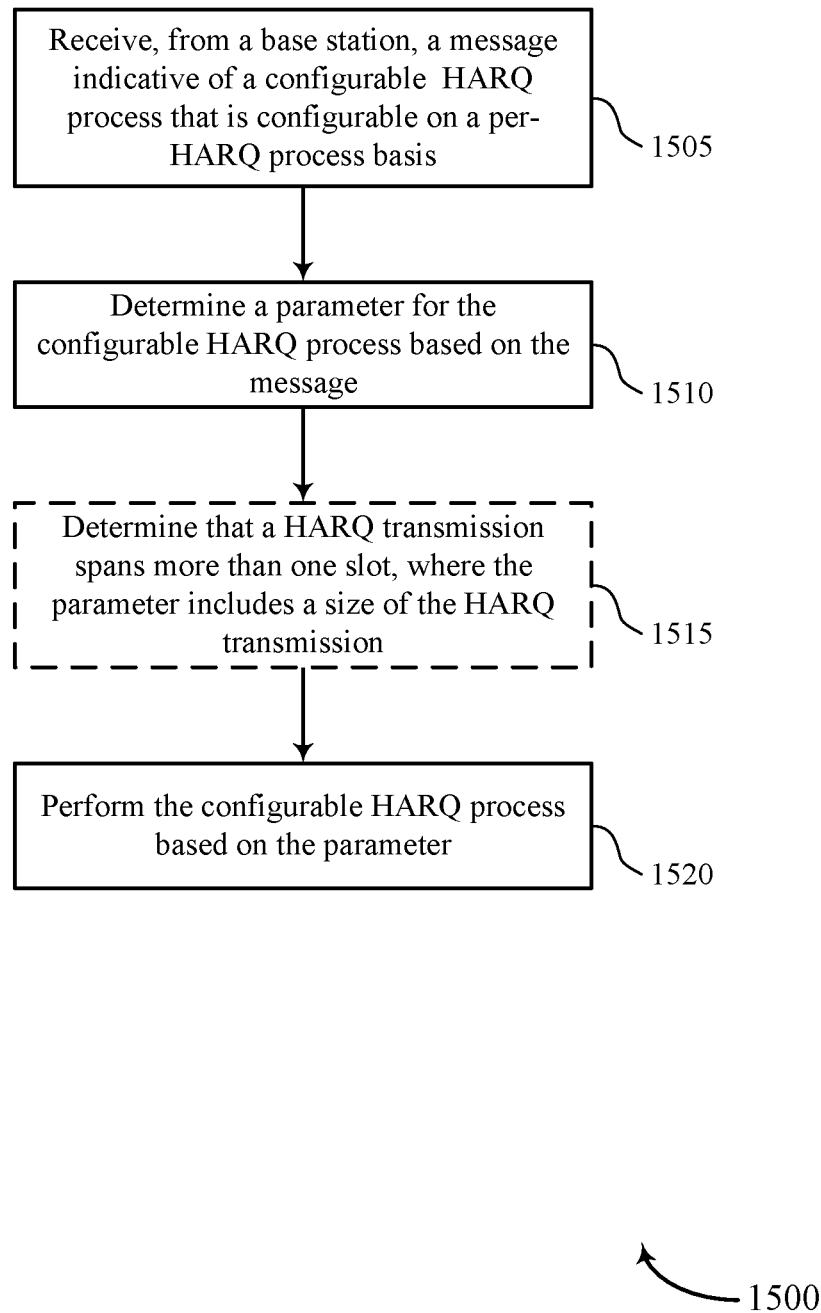

FIG. 15 shows a flowchart illustrating a method 1500 that supports dynamically configurable acknowledgement procedures in accordance with one or more aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, a message indicative of a configurable HARQ process that is configurable on a per-HARQ process basis. The operations of 1505 may be performed according to the methods described herein. In some examples, aspects of the operations of 1505 may be performed by a message receiver as described with reference to FIGS. 5 through 8.

At 1510, the UE may determine a parameter for the configurable HARQ process based on the message. The operations of 1510 may be performed according to the methods described herein. In some examples, aspects of the operations of 1510 may be performed by a parameter determination component as described with reference to FIGS. 5 through 8.

At 1515, the UE may determine that a HARQ transmission spans more than one slot, where the parameter includes a size of the HARQ transmission. The operations of 1515 may be performed according to the methods described herein. In some examples, aspects of the operations of 1515 may be performed by a parameter determination component as described with reference to FIGS. 5 through 8.

At 1520, the UE may perform the configurable HARQ process based on the parameter. The operations of 1520 may be performed according to the methods described herein. In some examples, aspects of the operations of 1520 may be performed by a HARQ performance component as described with reference to FIGS. 5 through 8.

Figure 16:
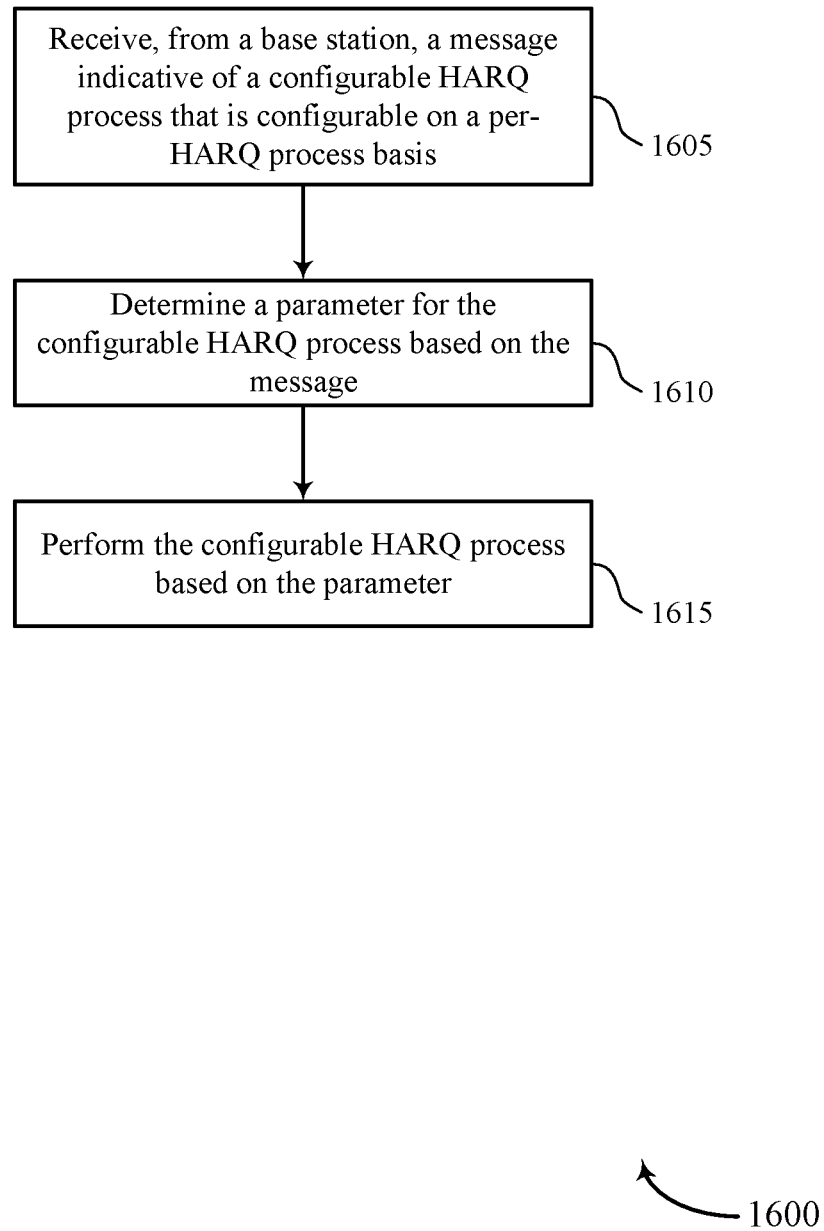

FIG. 16 shows a flowchart illustrating a method 1600 that supports dynamically configurable acknowledgement procedures in accordance with one or more aspects of the present disclosure. The operations of method 1600 may be implemented by a UE 115 or its components as described herein. For example, the operations of method 1600 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1605, the UE may receive, from a base station, a message indicative of a configurable HARQ process that is configurable on a per-HARQ process basis. The operations of 1605 may be performed according to the methods described herein. In some examples, aspects of the operations of 1605 may be performed by a message receiver as described with reference to FIGS. 5 through 8.

At 1610, the UE may determine a parameter for the configurable HARQ process based on the message. The operations of 1610 may be performed according to the methods described herein. In some examples, aspects of the operations of 1610 may be performed by a parameter determination component as described with reference to FIGS. 5 through 8.

At 1615, the UE may perform the configurable HARQ process based on the parameter. The operations of 1615 may be performed according to the methods described herein. In some examples, aspects of the operations of 1615 may be performed by a HARQ performance component as described with reference to FIGS. 5 through 8.

Figure 17:
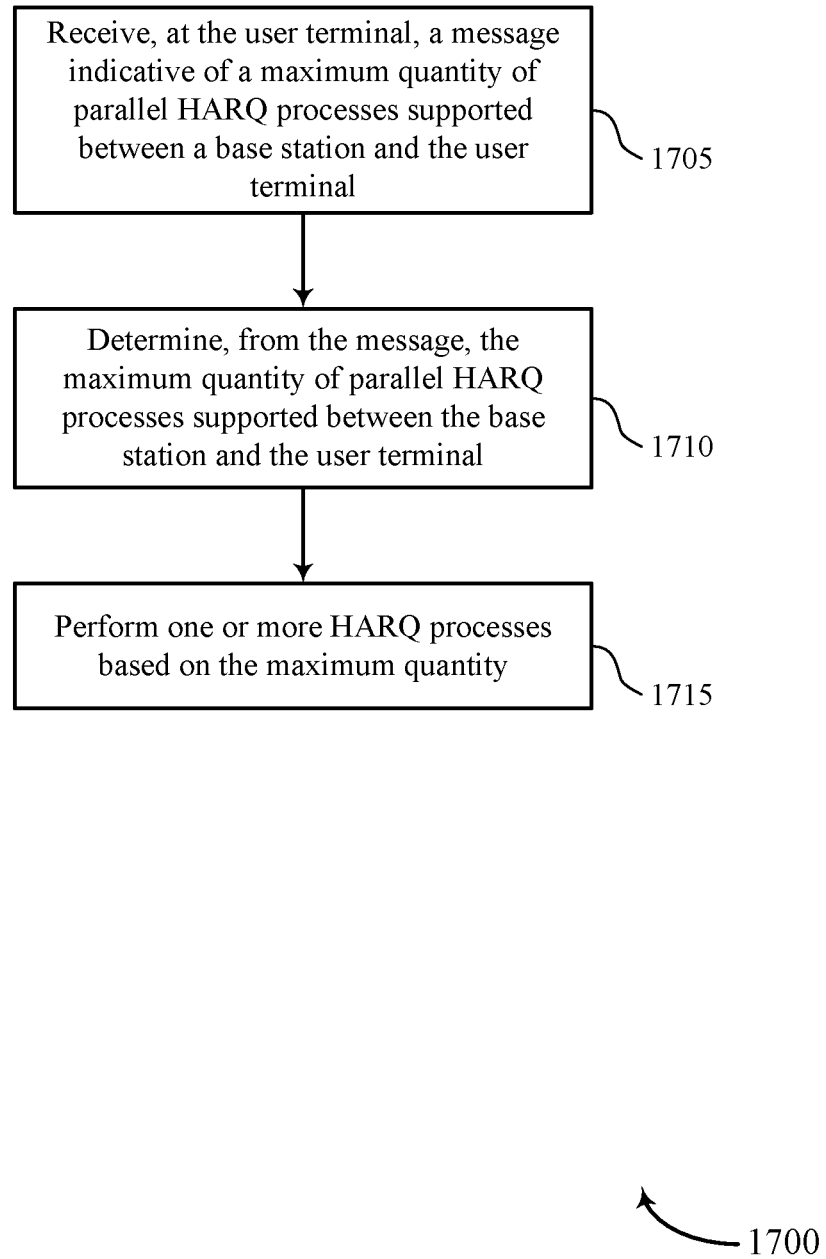

FIG. 17 shows a flowchart illustrating a method 1700 that supports dynamically configurable acknowledgement procedures in accordance with one or more aspects of the present disclosure. The operations of method 1700 may be implemented by a UE 115 or its components as described herein. For example, the operations of method 1700 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1705, the UE may receive, at the user terminal, a message indicative of a maximum quantity of parallel HARQ processes supported between a base station and the user terminal. The operations of 1705 may be performed according to the methods described herein. In some examples, aspects of the operations of 1705 may be performed by a message receiver as described with reference to FIGS. 5 through 8.

At 1710, the UE may determine, from the message, the maximum quantity of parallel HARQ processes supported between the base station and the user terminal. The operations of 1710 may be performed according to the methods described herein. In some examples, aspects of the operations of 1710 may be performed by a parameter determination component as described with reference to FIGS. 5 through 8.

At 1715, the UE may perform one or more HARQ processes based on the maximum quantity. The operations of 1715 may be performed according to the methods described herein. In some examples, aspects of the operations of 1715 may be performed by a HARQ performance component as described with reference to FIGS. 5 through 8.

Figure 18:
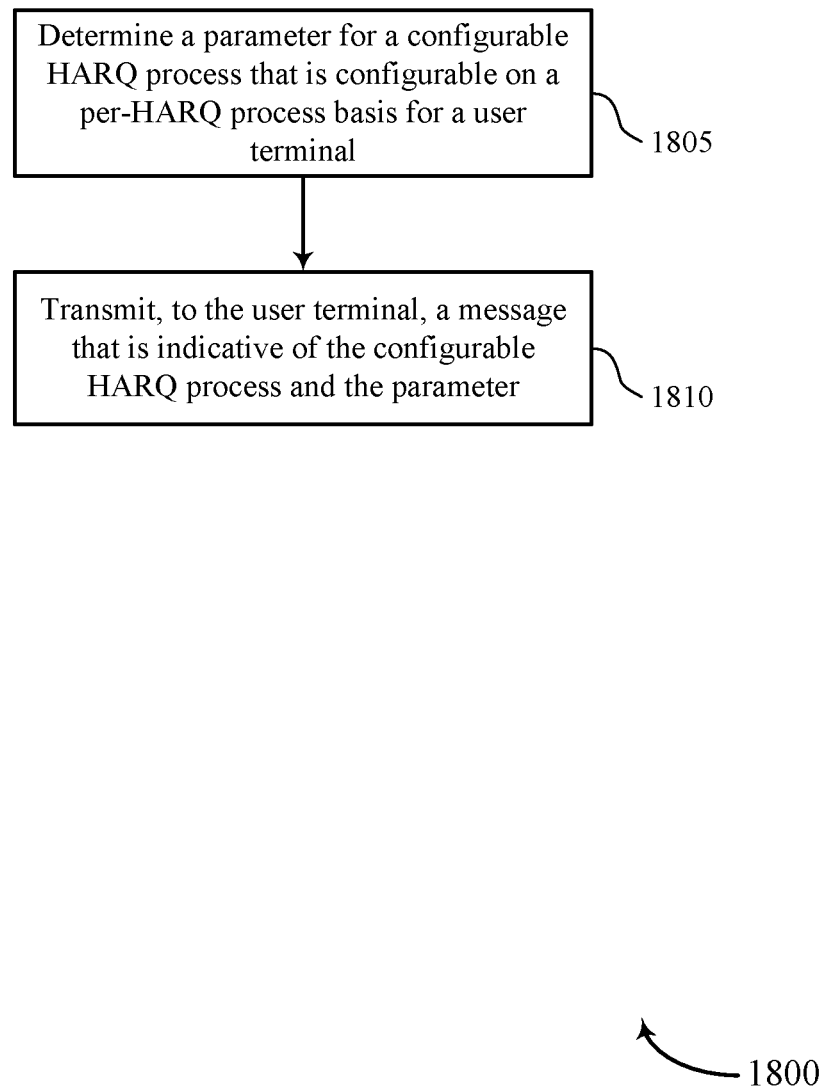

FIG. 18 shows a flowchart illustrating a method 2000 that supports dynamically configurable acknowledgement procedures in accordance with one or more aspects of the present disclosure. The operations of method 2000 may be implemented by a base station 105 or its components as described herein. For example, the operations of method 2000 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 2005, the base station may determine a parameter for a configurable HARQ process that is configurable on a per-HARQ process basis for a user terminal. The operations of 2005 may be performed according to the methods described herein. In some examples, aspects of the operations of 2005 may be performed by a parameter determination component as described with reference to FIGS. 9 through 12.

At 2010, the base station may transmit, to the user terminal, a message that is indicative of the configurable HARQ process and the parameter. The operations of 2010 may be performed according to the methods described herein. In some examples, aspects of the operations of 2010 may be performed by a message transmitter as described with reference to FIGS. 9 through 12.

Figure 19:
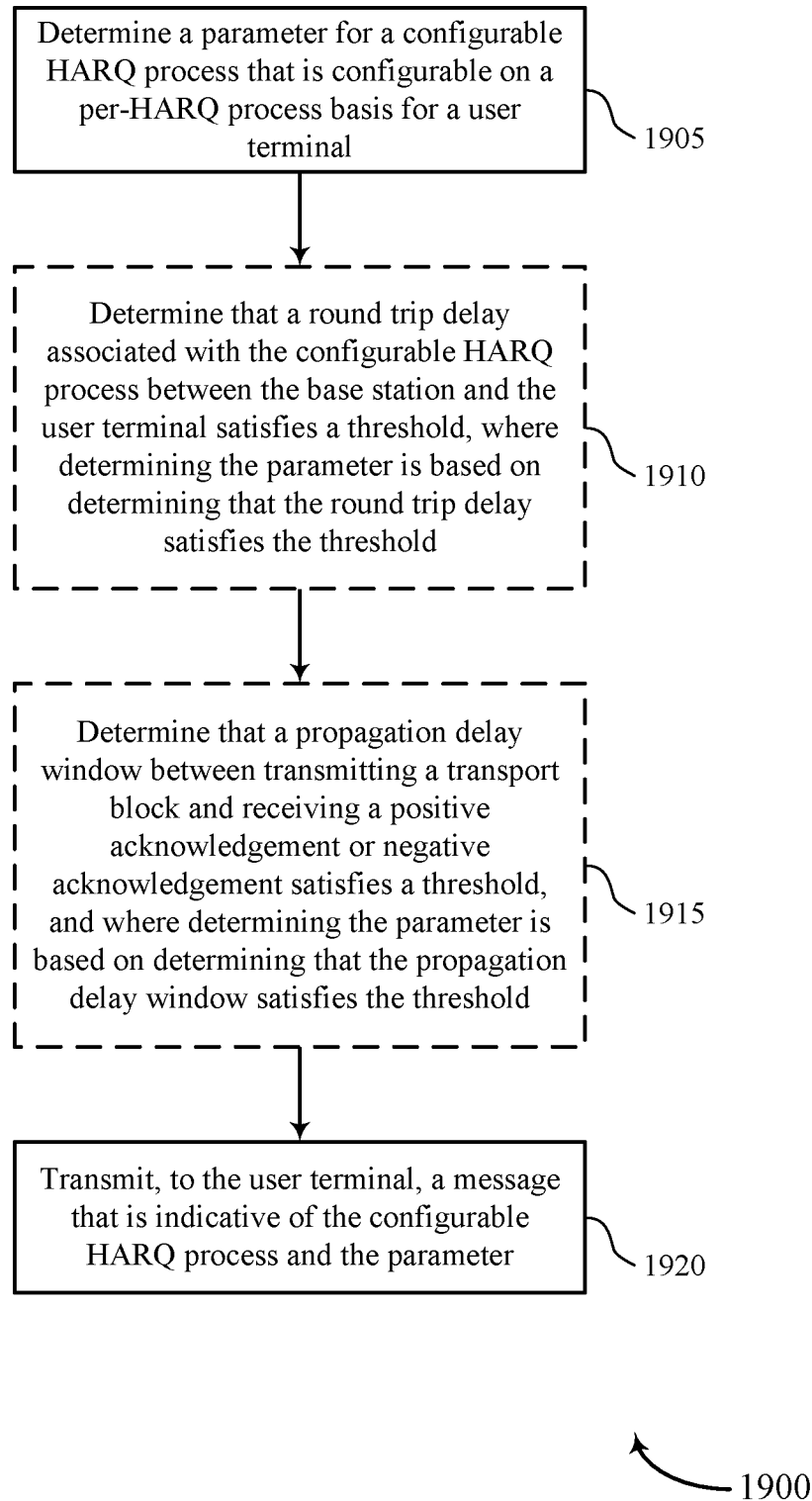

FIG. 19 shows a flowchart illustrating a method 1900 that supports dynamically configurable acknowledgement procedures in accordance with one or more aspects of the present disclosure. The operations of method 1900 may be implemented by a base station 105 or its components as described herein. For example, the operations of method 1900 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1905, the base station may determine a parameter for a configurable HARQ process that is configurable on a per-HARQ process basis for a user terminal. The operations of 1905 may be performed according to the methods described herein. In some examples, aspects of the operations of 1905 may be performed by a parameter determination component as described with reference to FIGS. 9 through 12.

At 1910, the base station may determine that a round trip delay associated with the configurable HARQ process between the base station and the user terminal satisfies a threshold, where determining the parameter is based on determining that the round trip delay satisfies the threshold. The operations of 1910 may be performed according to the methods described herein. In some examples, aspects of the operations of 1910 may be performed by a RTD determination component as described with reference to FIGS. 9 through 12.

At 1915, the base station may determine that a propagation delay window between transmitting a transport block and receiving a positive acknowledgement or negative acknowledgement satisfies a threshold, and where determining the parameter is based on determining that the propagation delay window satisfies the threshold. The operations of 1915 may be performed according to the methods described herein. In some examples, aspects of the operations of 1915 may be performed by a delay window identifier as described with reference to FIGS. 9 through 12.

At 1920, the base station may transmit, to the user terminal, a message that is indicative of the configurable HARQ process and the parameter. The operations of 1920 may be performed according to the methods described herein. In some examples, aspects of the operations of 1920 may be performed by a message transmitter as described with reference to FIGS. 9 through 12.

Figure 20:
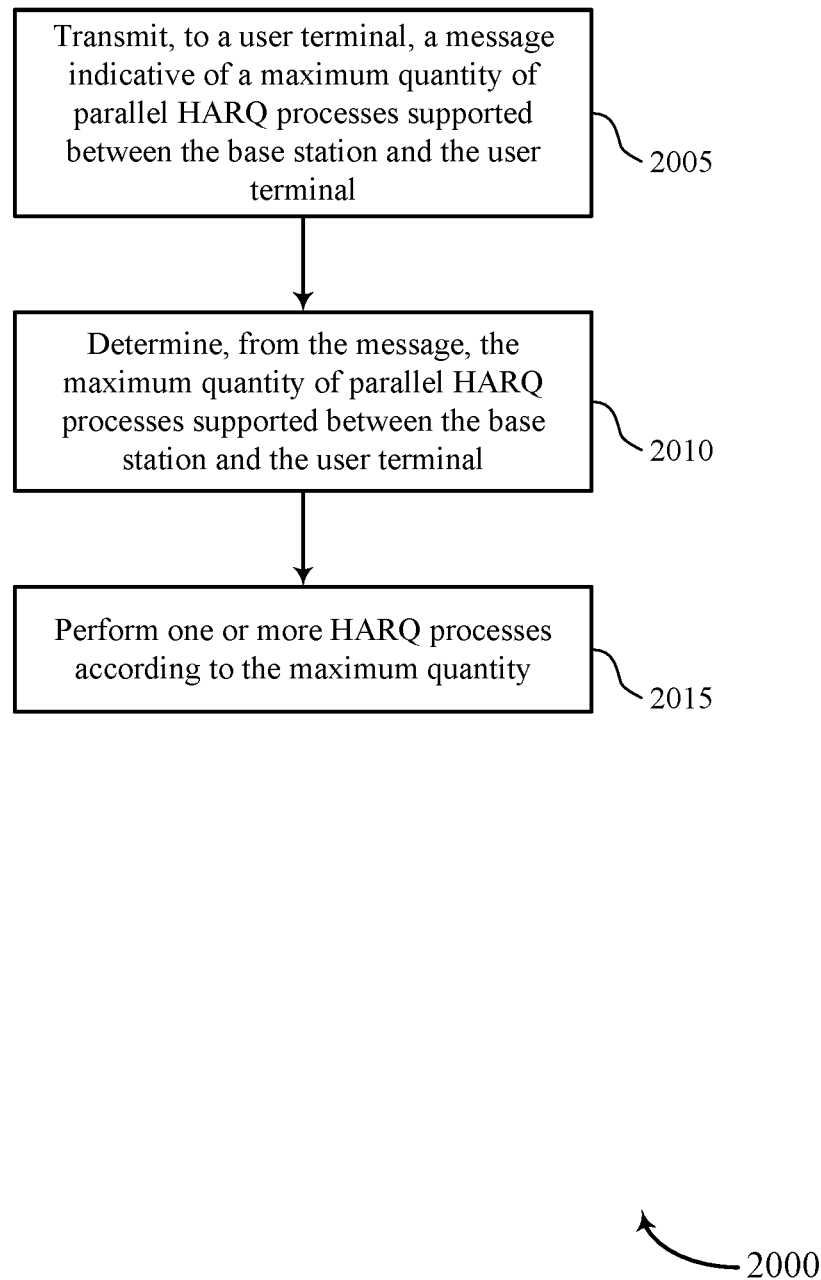

FIG. 20 shows a flowchart illustrating a method 2000 that supports dynamically configurable acknowledgement procedures in accordance with one or more aspects of the present disclosure. The operations of method 2000 may be implemented by a base station 105 or its components as described herein. For example, the operations of method 2000 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 2005, the base station may transmit, to a user terminal, a message indicative of a maximum quantity of parallel HARQ processes supported between the base station and the user terminal. The operations of 2005 may be performed according to the methods described herein. In some examples, aspects of the operations of 2005 may be performed by a message transmitter as described with reference to FIGS. 9 through 12.

At 2010, the base station may determine, from the message, the maximum quantity of parallel HARQ processes supported between the base station and the user terminal. The operations of 2010 may be performed according to the methods described herein. In some examples, aspects of the operations of 2010 may be performed by a parameter determination component as described with reference to FIGS. 9 through 12.

At 2015, the base station may perform one or more HARQ processes according to the maximum quantity. The operations of 2015 may be performed according to the methods described herein. In some examples, aspects of the operations of 2015 may be performed by a HARQ performance component as described with reference to FIGS. 9 through 12.

It should be noted that the methods described herein describe possible implementations, and that the operations and the procedures may be rearranged or otherwise modified and that other implementations are possible. Further, aspects from two or more of the methods may be combined.

The following provides an overview of examples of the present disclosure:

Example 1

A method for wireless communication at a user terminal, comprising: transmitting, to a base station, a first message indicating a capability of the user terminal for participating in a configurable acknowledgement process; receiving, from the base station, a second message indicative of the configurable acknowledgement process, wherein the configurable acknowledgement process is based at least in part on the capability of the user terminal; determining a parameter for the configurable acknowledgement process based at least in part on the second message; and performing the configurable acknowledgement process based at least in part on the parameter.

Example 2

The method of example 1, further comprising: identifying that a wireless communication link for communicating the second message associated with the configurable acknowledgement process is part of a non-terrestrial network, wherein determining the parameter is based at least in part on identifying that the wireless communication link is part of the non-terrestrial network.

Example 3

The method of examples 1 or 2, further comprising: determining that a round trip delay associated with the configurable acknowledgement process between the base station and the user terminal satisfies a threshold, wherein determining the parameter is based at least in part on determining that the round trip delay satisfies the threshold.

Example 4

The method of examples 1 to 3, further comprising: identifying that a propagation delay window between transmitting a message and receiving an acknowledgement or negative acknowledgement satisfies a threshold, wherein determining the parameter is based at least in part on determining that the propagation delay window satisfies the threshold.

Example 5

The method of examples 1 to 4, wherein determining the parameter further comprises: reducing a quantity of maximum HARQ retransmissions allowed during the configurable acknowledgement process based at least in part on receiving the second message.

Example 6

The method of example 5, wherein the parameter comprises the quantity of maximum HARQ retransmissions.

Example 7

The method of examples 5 or 6, further comprising: identifying modulation and coding scheme information associated with the quantity of maximum HARQ retransmissions, wherein performing the configurable acknowledgement process is based at least in part on identifying the modulation and coding scheme information.

Example 8

The method of examples 1 to 4, wherein determining the parameter further comprises: determining to disable HARQ retransmission associated with one or more messages.

Example 9

The method of example 8, wherein the parameter indicates that a quantity of maximum HARQ retransmissions is equal to zero.

Example 10

The method of examples 8 or 9, wherein the second message comprises radio resource control (RRC) signaling configured to disable the HARQ retransmissions.

Example 11

The method of examples 8 or 9, wherein the second message comprises downlink control information configured to disable the HARQ retransmissions.

Example 12

The method of examples 8 or 9, wherein the second message comprises a system information block.

Example 13

The method of examples 8 to 12, further comprising: identifying a HARQ identifier that indicates the HARQ retransmissions are disabled based at least in part on receiving the second message, wherein the second message includes the identified HARQ identifier.

Example 14

The method of examples 8 to 13, further comprising: flushing one or more buffers associated with the configurable acknowledgement process based at least in part on receiving the second message, wherein the second message comprises an indicator to cause the user terminal to flush the one or more buffers associated with the configurable acknowledgement process.

Example 15

The method of example 14, wherein the indicator comprises a new data indicator (NDI), a code block group transmission information (CBGTI) indicator, a code block group flushing out information (CBGFI) indicator, or a combination thereof.

Example 16

The method of examples 8 or 9, wherein the second message comprises a HARQ acknowledgement configured to cause the user terminal to flush a buffer associated with the configurable acknowledgement process.

Example 17

The method of examples 1 to 16, wherein determining the parameter further comprises: determining a quantity of parallel HARQ processes between the base station and the user terminal.

Example 18

The method of example 17, wherein the quantity of parallel HARQ processes is greater than sixteen HARQ processes.

Example 19

The method of example 17 or 18, wherein: the first message indicates a quantity of buffers the user terminal is configurable to use for parallel HARQ processes; and the quantity of parallel HARQ processes is based at least in part on the quantity of buffers.

Example 20

The method of examples 17 to 19, wherein the second message comprises a HARQ identifier having five or more bits.

Example 21

The method of examples 17 to 20, further comprising: identifying a HARQ identifier and at least one of a slot number, a time, or a subframe count; and identifying a first HARQ process of the quantity of parallel HARQ processes based at least in part on the HARQ identifier and at least one of the slot number, the time, or the subframe count, wherein transmitting the second message is based at least in part on identifying the first HARQ process.

Example 22

The method of examples 17 to 21, wherein a first HARQ process of the quantity of parallel HARQ processes is indexed by a HARQ identifier and at least one of a slot number, a time, or a subframe count.

Example 23

The method of examples 17 to 22, further comprising: configuring a quantity of acknowledgement or negative acknowledgement bits included in a single message that is associated with the quantity of parallel HARQ processes; and transmitting the single message with the quantity of acknowledgement or negative acknowledgement bits based at least in part on receiving the second message.

Example 24

The method of examples 1 to 23, wherein determining the parameter further comprises: determining that a HARQ transmission spans more than one slot, wherein the parameter comprises a size of the HARQ transmission.

Example 25

The method of example 24, further comprising: determining a size of a transport block associated with the HARQ transmission, wherein determining that the HARQ transmission spans more than one slot is based at least in part on determining the size of the transport block.

Example 26

The method of example 24, further comprising: receiving one or more grouped code blocks from multiple transport blocks over multiple slots.

Example 27

The method of example 24, wherein the size of the HARQ transmission is configured to fill a propagation delay window associated with a round trip delay of the configurable acknowledgement process.

Example 28

A method for wireless communication at a base station, comprising: receiving, from a user terminal, a first message indicating a capability of the user terminal to participate in a configurable acknowledgement process; determining a parameter for the configurable acknowledgement process based at least in part on the capability of the user terminal; and transmitting, to the user terminal, a second message that is indicative of the configurable acknowledgement process and the parameter.

Example 29

The method of example 28, further comprising: identifying that a wireless communication link for communicating the second message associated with the configurable acknowledgment process is part of a non-terrestrial network, wherein determining the parameter is based at least in part on identifying that the wireless communication link is part of the non-terrestrial network.

Example 30

The method of example 28 or 29, further comprising: determining that a round trip delay associated with the configurable acknowledgement process between the base station and the user terminal satisfies a threshold, wherein determining the parameter is based at least in part on determining that the round trip delay satisfies the threshold.

Example 31

The method of example 28 to 30, further comprising: identifying that a propagation delay window between transmitting a message and receiving an acknowledgement or negative acknowledgement satisfies a threshold, wherein determining the parameter is based at least in part on determining that the propagation delay window satisfies the threshold.

Example 32

The method of examples 28 to 31, wherein determining the parameter further comprises: reducing a quantity of maximum HARQ retransmissions allowed during the configurable acknowledgement process based at least in part on the capability of the user terminal.

Example 33

The method of example 32, wherein the parameter comprises the quantity of maximum HARQ retransmissions.

Example 34

The method of example 32, further comprising: identifying modulation and coding scheme information associated with the quantity of maximum HARQ retransmissions, wherein transmitting the second message is based at least in part on identifying the modulation and coding scheme information.

Example 35

The method of example 28 to 31, wherein determining the parameter further comprises: determining to disable HARQ retransmission associated with one or more messages.

Example 36

The method of example 35, wherein the parameter indicates that a quantity of maximum HARQ retransmissions is equal to zero.

Example 37

The method of example 35, wherein: disabling HARQ retransmissions is done on a per-user terminal basis.

Example 38

The method of example 35 to 37, wherein the second message comprises radio resource control (RRC) signaling configured to disable the HARQ retransmissions.

Example 39

The method of example 35 to 37, wherein the second message comprises downlink control information configured to disable the HARQ retransmissions.

Example 40

The method of example 35, wherein: disabling HARQ retransmissions is done on a per-cell basis.

Example 41

The method of examples 35 to 38, wherein the second message comprises a system information block.

Example 42

The method of examples 35 to 41, further comprising: identifying a HARQ identifier that indicates the HARQ retransmissions are disabled, wherein the second message includes the identified HARQ identifier.

Example 43

The method of example 35 to 37, wherein the second message comprises an indicator that causes the user terminal to flush one or more buffers associated with the configurable acknowledgement process.

Example 44

The method of example 43, wherein the indicator comprises a new data indicator (NDI), a code block group transmission information (CBGTI) indicator, a code block group flushing out information (CBGFI) indicator, or a combination thereof.

Example 45

The method of examples 35 to 37, wherein the second message comprises a HARQ acknowledgement configured to cause the user terminal to flush a buffer associated with the configurable acknowledgement process.

Example 46

The method of examples 28 to 31, wherein determining the parameter further comprises: determining a quantity of parallel HARQ processes between the base station and the user terminal.

Example 47

The method of example 46, wherein the quantity of parallel HARQ processes is greater than sixteen HARQ processes.

Example 48

The method of examples 46 or 47, wherein: the first message indicates a quantity of buffers the user terminal is configurable to use for parallel HARQ processes; and the quantity of parallel HARQ processes is based at least in part on the quantity of buffers.

Example 49

The method of examples 46 to 48, wherein the second message comprises a HARQ identifier having five or more bits.

Example 50

The method of examples 46 to 49, further comprising: identifying a HARQ identifier and at least one of a slot number, a time, or a subframe count; and identifying a first HARQ process of the quantity of parallel HARQ processes based at least in part on the HARQ identifier and at least one of the slot number, the time, or the subframe count, wherein transmitting the second message is based at least in part on identifying the first HARQ process.

Example 51

The method of examples 46 to 50, wherein a first HARQ process of the quantity of parallel HARQ processes is indexed by a HARQ identifier and at least one of a slot number, a time, or a subframe count.

Example 52

The method of examples 46 to 51, further comprising: configuring a quantity of acknowledgement or negative acknowledgement bits included in a single message that is associated with the quantity of parallel HARQ processes; and receiving the single message with the quantity of acknowledgement or negative acknowledgement bits based at least in part on transmitting the second message.

Example 53

The method of examples 28 to 31, wherein determining the parameter further comprises: determining that a HARQ transmission spans more than one slot, wherein the parameter comprises a size of the HARQ transmission.

Example 54

The method of example 53, further comprising: determining a size of a transport block associated with the HARQ transmission, wherein determining that the HARQ transmission spans more than one slot is based at least in part on determining the size of the transport block.

Example 55

The method of examples 53 or 54, further comprising: grouping code blocks from multiple transport blocks; and transmitting the grouped code blocks over multiple slots.

Example 56

The method of examples 53 to 55, further comprising: enlarging the size of the HARQ transmission to fill a propagation delay window associated with a round trip delay of the configurable acknowledgement process.

Example 57

An apparatus for wireless communications comprising a processor; and memory coupled to the processor, the processor and memory configured to perform a method of any of examples 1 to 27.

Example 58

An apparatus for wireless communications comprising a processor; and memory coupled to the processor, the processor and memory configured to perform a method of any of examples 28 to 56.

Example 59

An apparatus comprising at least one means for performing a method of any of examples 1 to 27.

Example 60

An apparatus comprising at least one means for performing a method of any of examples 28 to 56.

Example 61

A non-transitory computer-readable medium storing code for wireless communications, the code comprising instructions executable by a processor to perform a method of any of examples 1-27.

Example 62

A non-transitory computer-readable medium storing code for wireless communications, the code comprising instructions executable by a processor to perform a method of any of examples 28-56.

Example 63

A method for wireless communication at a user terminal, comprising: receiving, from a base station, a message indicative of a configurable HARQ process that is configurable on a per-HARQ process basis; determining a parameter for the configurable HARQ process based at least in part on the message; and performing the configurable HARQ process based at least in part on the parameter.

Example 64

The method of example 63, wherein the message is received via a communication link in a non-terrestrial network, and wherein determining the parameter is based at least in part on the wireless communication link being a part of the non-terrestrial network.

Example 65

The method of claim examples 63 or 64, further comprising: determining that a round trip delay associated with the configurable HARQ process between the base station and the user terminal satisfies a threshold, wherein determining the parameter is based at least in part on determining that the round trip delay satisfies the threshold.

Example 66

The method of examples 63 to 65, further comprising: determining that a propagation delay window between transmitting a transport block and receiving a positive acknowledgement or negative acknowledgement satisfies a threshold, and wherein determining the parameter is based at least in part on determining that the propagation delay window satisfies the threshold.

Example 67

The method of examples 63 to 66, wherein determining the parameter further comprises: reducing a quantity of maximum HARQ retransmissions allowed during the configurable HARQ process based at least in part on receiving the message.

Example 68

The method of example 67, wherein the parameter indicates whether HARQ combining is used for performing the configurable HARQ process.

Example 69

The method of examples 63 to 68, wherein performing the configurable HARQ process is based at least in part on the modulation and coding scheme information associated with a quantity of maximum HARQ processes.

Example 70

The method of examples 63 to 69, wherein determining the parameter further comprises: determining to disable one or more features of the HARQ process associated with one or more transport blocks.

Example 71

The method of example 70, wherein the parameter indicates that a positive acknowledgement or a negative acknowledgement will follow a data transmission.

Example 72

The method of example 70, wherein the message is received via radio resource control (RRC) signaling or in a system information block (SIB).

Example 73

The method of examples 63 to 72, wherein the HARQ process is disabled based at least in part on receiving the message, wherein the message includes an identified HARQ process identifier.

Example 74

The method of example 63 to 73, further comprising: flushing one or more buffers associated with the configurable HARQ process based at least in part on receiving the message, wherein the message comprises an indicator to cause the user terminal to flush the one or more buffers associated with the configurable HARQ process.

Example 75

The method of example 63 to 75, wherein determining the parameter further comprises: determining that a HARQ transmission spans more than one slot, wherein the parameter comprises a size of the HARQ transmission.

Example 76

The method of example 75, further comprising: receiving one or more grouped code blocks from the transport block over multiple slots.

Example 77

A method for wireless communication at a user terminal, comprising: receiving, at the user terminal, a message indicative of a maximum quantity of parallel HARQ processes supported between a base station and the user terminal; determining, from the message, the maximum quantity of parallel HARQ processes supported between the base station and the user terminal; and performing one or more HARQ processes based at least in part on the maximum quantity.

Example 78

The method of example 77, wherein the message is received in a system information block or radio resource control signaling.

Example 79

The method of examples 77 or 78, wherein the maximum quantity of parallel HARQ processes is based at least in part on a quantity of buffers the user terminal is configurable to use for parallel HARQ processes.

Example 80

The method of examples 77 to 79, further comprising: identifying a HARQ identifier and at least one of a slot number, a time, or a subframe count; and identifying a first HARQ process of the quantity of parallel HARQ processes based at least in part on the HARQ identifier and at least one of the slot number, the time, or the subframe count, wherein transmitting the message is based at least in part on identifying the first HARQ process.

Example 81

The method of examples 77 to 80, wherein a first HARQ process of the quantity of parallel HARQ processes is indexed by a HARQ identifier and at least one of a slot number, a time, or a subframe count.

Example 82

The method of examples 77 to 81, further comprising: configuring a quantity of acknowledgement or negative acknowledgement bits included in a single message that is associated with the quantity of parallel HARQ processes; and transmitting the single message with the quantity of acknowledgement or negative acknowledgement bits based at least in part on receiving the message.

Example 83

A method for wireless communication at a base station, comprising: determining a parameter for a configurable HARQ process that is configurable on a per-HARQ process basis for a user terminal; and transmitting, to the user terminal, a message that is indicative of the configurable HARQ process and the parameter.

Example 84

The method of example 83, wherein the message is received via a communication link in a non-terrestrial network, and wherein determining the parameter is based at least in part on the wireless communication link being a part of the non-terrestrial network.

Example 85

The method of examples 83 or 84, further comprising: determining that a round trip delay associated with the configurable HARQ process between the base station and the user terminal satisfies a threshold, wherein determining the parameter is based at least in part on determining that the round trip delay satisfies the threshold.

Example 86

The method of examples 83 to 85, further comprising: determining that a propagation delay window between transmitting a transport block and receiving a positive acknowledgement or negative acknowledgement satisfies a threshold, and wherein determining the parameter is based at least in part on determining that the propagation delay window satisfies the threshold.

Example 87

The method of examples 83 to 86, wherein determining the parameter further comprises: determining to disable one or more features of the HARQ process associated with one or more transport blocks.

Example 88

The method of examples 83 to 87, wherein determining the parameter further comprises: determining that a HARQ transmission spans more than one slot, wherein the parameter comprises a size of the HARQ transmission.

Example 89

A method for wireless communication at a base station, comprising: transmitting, to a user terminal, a message indicative of a maximum quantity of parallel HARQ processes supported between the base station and the user terminal; determining, from the message, the maximum quantity of parallel HARQ processes supported between the base station and the user terminal; and performing one or more HARQ processes according to the maximum quantity.

Example 90

The method of example 89, wherein the maximum quantity of parallel HARQ processes is based at least in part on a quantity of buffers the user terminal is configurable to use for parallel HARQ processes.

Example 91

The method of examples 89 or 90, further comprising: identifying a HARQ identifier and at least one of a slot number, a time, or a subframe count; and identifying a first HARQ process of the quantity of parallel HARQ processes based at least in part on the HARQ identifier and at least one of the slot number, the time, or the subframe count, wherein transmitting the message is based at least in part on identifying the first HARQ process.

Techniques described herein may be used for various wireless communications systems such as CDMA, TDMA, FDMA, OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by user terminals with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by user terminals with service subscriptions with the network provider. A femto cell may also cover a small geographic area (e.g., a home) and may provide restricted access by user terminals having an association with the femto cell (e.g., user terminals in a closed subscriber group (CSG), user terminals for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative operations and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary procedure that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user terminal, comprising:
    transmitting a message indicating a first capability of the user terminal to support configuration of a configurable hybrid automatic repeat request (HARQ) process that is communicated via one or more communication links of a non-terrestrial network, the message also indicating a second capability of the user terminal to support a first maximum quantity of HARQ processes during communications via the one or more communication links of the non-terrestrial network;
    receiving radio resource control signaling that indicates at least one HARQ process identifier corresponding to the configurable HARQ process, wherein the radio resource control signaling indicates that feedback for the configurable HARQ process corresponding to the at least one HARQ process identifier is to be disabled and indicates a second maximum quantity of HARQ processes associated with the configurable HARQ process; and
    disabling the feedback for the configurable HARQ process based at least in part on the radio resource control signaling.

2. The method of claim 1, wherein the message is received via a communication link in a non-terrestrial network, and wherein determining the parameter is based at least in part on the communication link being a part of the non-terrestrial network.

3. The method of claim 1, further comprising:
    determining that a round trip delay associated with the configurable HARQ process between the base station and the user terminal satisfies a threshold, wherein determining the parameter is based at least in part on determining that the round trip delay satisfies the threshold.

4. The method of claim 1, further comprising:
    determining that a propagation delay window between transmitting a transport block and receiving a positive acknowledgement or negative acknowledgement satisfies a threshold, and wherein determining the parameter is based at least in part on determining that the propagation delay window satisfies the threshold.

5. The method of claim 1, further comprising:
reducing a quantity of maximum HARQ retransmissions allowed during the configurable HARQ process based at least in part on receiving the radio resource control signaling.

6. The method of claim 1, wherein performing the configurable HARQ process is based at least in part on modulation and coding scheme information associated with a quantity of maximum HARQ processes.

7. The method of claim 1, further comprising:
determining to disable one or more features of the configurable HARQ process associated with one or more transport blocks.

8. The method of claim 1, wherein the HARQ process is disabled based at least in part on receiving the message, wherein the message includes an identified HARQ process identifier.

9. The method of claim 1, further comprising:
flushing one or more buffers associated with the configurable HARQ process based at least in part on receiving the radio resource control signaling, wherein the radio resource control signaling comprises an indicator to cause the user terminal to flush the one or more buffers associated with the configurable HARQ process.

10. The method of claim 1, wherein determining the parameter further comprises:
determining that a HARQ transmission spans more than one slot, wherein the parameter comprises a size of the HARQ transmission.

11. The method of claim 10, further comprising:
receiving one or more grouped code blocks from a transport block over multiple slots.

12. A method for wireless communication at a network device, comprising:
receiving a message indicating a first capability of a user terminal to support configuration of a hybrid automatic repeat request (HARQ) process that is communicated via one or more communication links of a non-terrestrial network, the message also indicating a second capability of the user terminal to support a first maximum quantity of HARQ processes during communications via the one or more communication links of the non-terrestrial network; and transmitting, to the user terminal, radio resource control signaling that indicates at least one HARQ process identifier corresponding to the configurable HARQ process, wherein the radio resource control signaling indicates that feedback for the configurable HARQ process corresponding to the at least one HARQ process identifier is to be disabled and indicates a second maximum quantity of HARQ processes associated with the configurable HARQ process.

13. The method of claim 12, further comprising:
determining that a round trip delay associated with the configurable HARQ process between the base station and the user terminal satisfies a threshold, wherein determining the parameter is based at least in part on determining that the round trip delay satisfies the threshold.

14. The method of claim 12, further comprising:
determining that a propagation delay window between transmitting a transport block and receiving a positive acknowledgement or negative acknowledgement satisfies a threshold, and wherein determining the parameter is based at least in part on determining that the propagation delay window satisfies the threshold.

15. The method of claim 12, further comprising:
determining to disable one or more features of the configurable HARQ process associated with one or more transport blocks.

16. The method of claim 15, wherein disabling HARQ processes is done on a per-cell basis.

17. The method of claim 15, wherein the radio resource control signaling comprises an indicator that causes the user terminal to flush one or more buffers associated with the configurable HARQ process.

18. The method of claim 15, wherein the radio resource control signaling comprises a HARQ acknowledgement configured to cause the user terminal to flush a buffer associated with the configurable HARQ process.

19. The method of claim 12, wherein determining the parameter further comprises:
determining that a HARQ transmission spans more than one slot, wherein the parameter comprises a size of the HARQ transmission.

20. The method of claim 19, further comprising:
grouping code blocks from multiple transport blocks; and
transmitting the grouped code blocks over multiple slots.

* * * * *